US011863911B2

(12) United States Patent
Hoshino et al.

(10) Patent No.: US 11,863,911 B2
(45) Date of Patent: Jan. 2, 2024

(54) IMAGING SYSTEM, METHOD OF CONTROLLING IMAGING SYSTEM, AND OBJECT RECOGNITION SYSTEM

(71) Applicant: Sony Semiconductor Solutions Corporation, Kanagawa (JP)

(72) Inventors: Kazuhiro Hoshino, Kanagawa (JP); Masatsugu Fukunago, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 237 days.

(21) Appl. No.: 17/430,835

(22) PCT Filed: Mar. 13, 2020

(86) PCT No.: PCT/JP2020/011163
§ 371 (c)(1),
(2) Date: Aug. 13, 2021

(87) PCT Pub. No.: WO2020/195966
PCT Pub. Date: Oct. 1, 2020

(65) Prior Publication Data
US 2022/0166958 A1 May 26, 2022

(30) Foreign Application Priority Data

Mar. 27, 2019 (JP) ................. 2019-059695

(51) Int. Cl.
*H04N 7/18* (2006.01)
*G06V 20/56* (2022.01)
*H04N 5/33* (2023.01)
(52) U.S. Cl.
CPC ........... *H04N 7/188* (2013.01); *G06V 20/588* (2022.01); *H04N 5/33* (2013.01)
(58) Field of Classification Search
CPC ......... H04N 5/33; H04N 7/188; G06V 20/588
See application file for complete search history.

(56) References Cited

U.S. PATENT DOCUMENTS

| 2016/0009647 A1 | 1/2016 | Renga |
| 2016/0096477 A1 | 4/2016 | Biemer |
| 2017/0084044 A1 | 3/2017 | Keh et al. |

FOREIGN PATENT DOCUMENTS

| JP | 2010-510732 A | 4/2010 |
| JP | 2013-079937 A | 5/2013 |

(Continued)

OTHER PUBLICATIONS

International Search Report (PCT/ISA/210), International Application No. PCT/JP2020/011163, dated May 25, 2020.

(Continued)

*Primary Examiner* — On S Mung
(74) *Attorney, Agent, or Firm* — Michael Best & Friedrich LLP

(57) ABSTRACT

An imaging system of the present disclosure includes an event detection device that detects, as an event, that a luminance change of a pixel that photoelectrically converts incident light exceeds a predetermined threshold, an imaging device that captures an image at a fixed frame rate, and a control section that controls the event detection device and the imaging device, and is mounted on and used in a moving body. Then, the control section performs control to acquire image information of a region including the event by the imaging device in response to the event detection device detecting the event. Furthermore, an object recognition system of the present disclosure detects an event by the event detection device under the control of the control section, acquires image information of a region including the event by the imaging device, and performs object recognition based on the acquired image information.

18 Claims, 26 Drawing Sheets

(56) References Cited

FOREIGN PATENT DOCUMENTS

| | | |
|---|---|---|
| JP | 2018-186478 A | 11/2018 |
| JP | 2019-023794 A | 2/2019 |

OTHER PUBLICATIONS

Notification of Transmittal of the International Search Report and the Written Opinion of the International Searching Authority, or the Declaration (PCT/ISA/220), International Application No. PCT/JP2020/011163, dated Jun. 2, 2020.

Written Opinion of the International Search Authority (PCT/ISA/237), International Application No. PCT/JP2020/011163, dated Jun. 2, 2020.

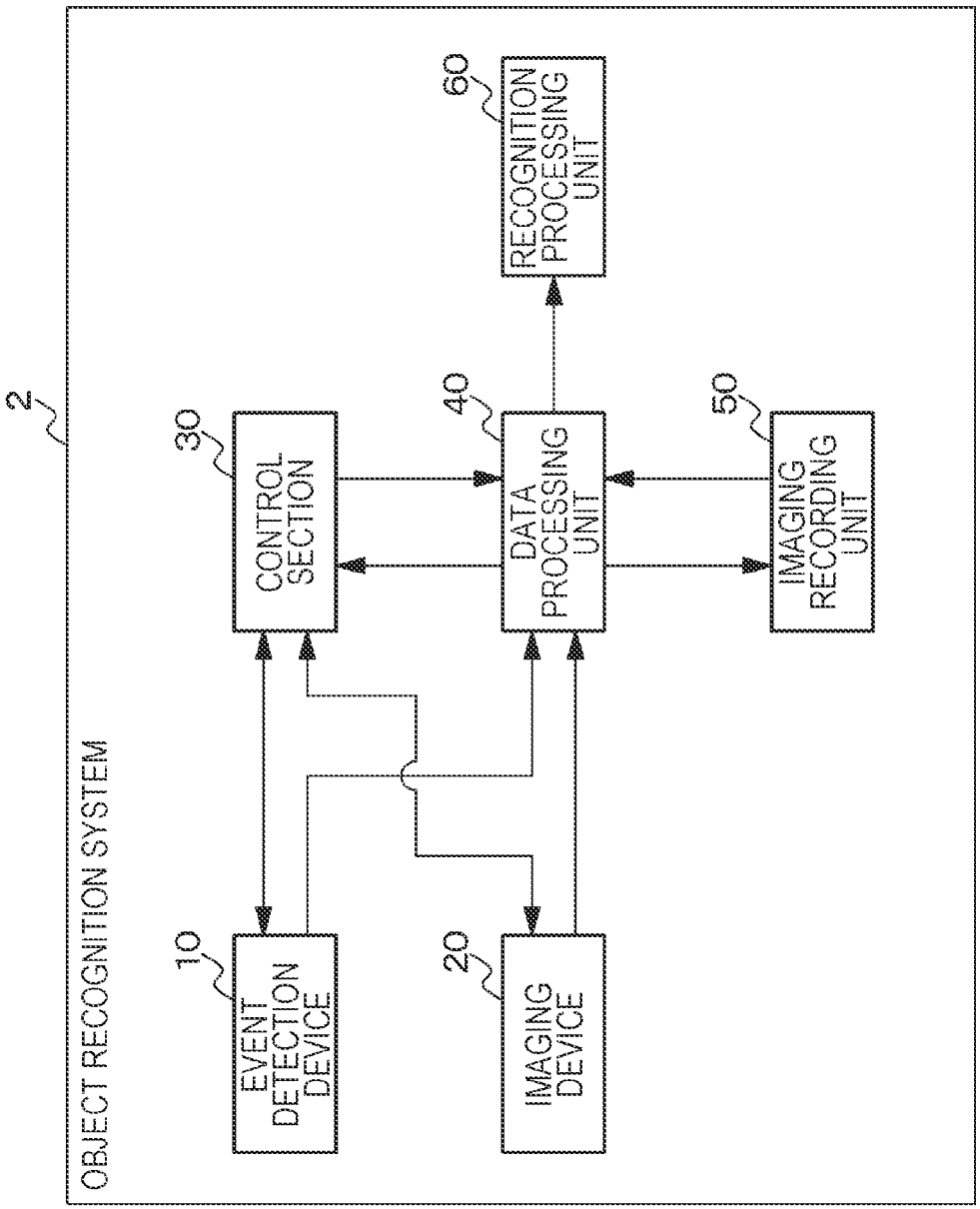

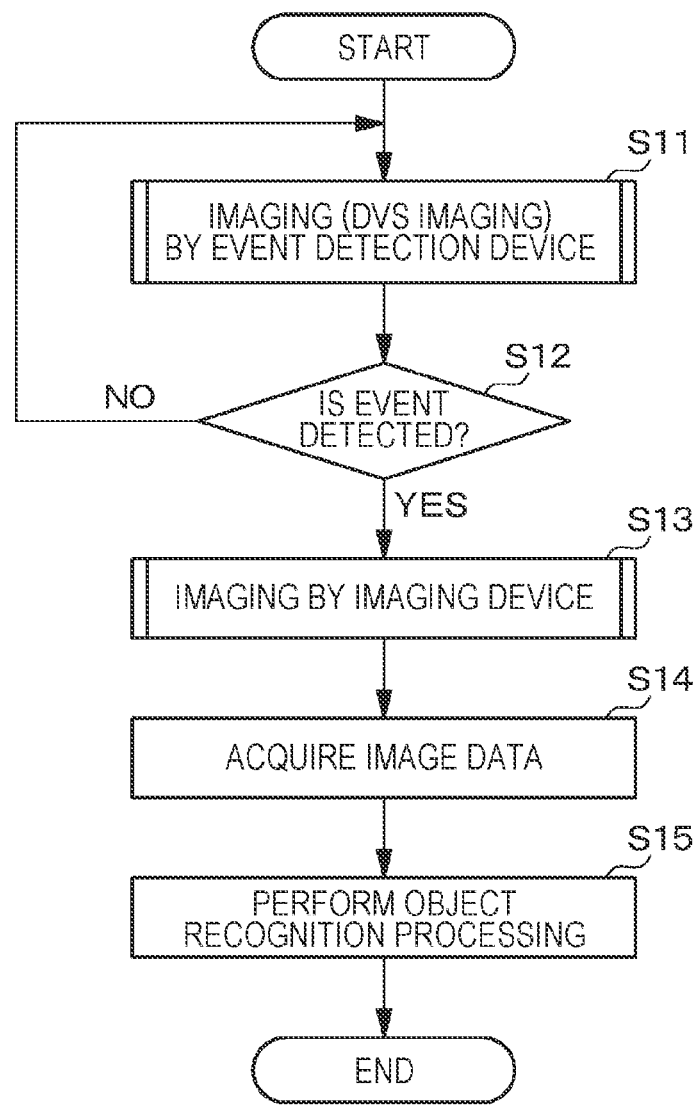

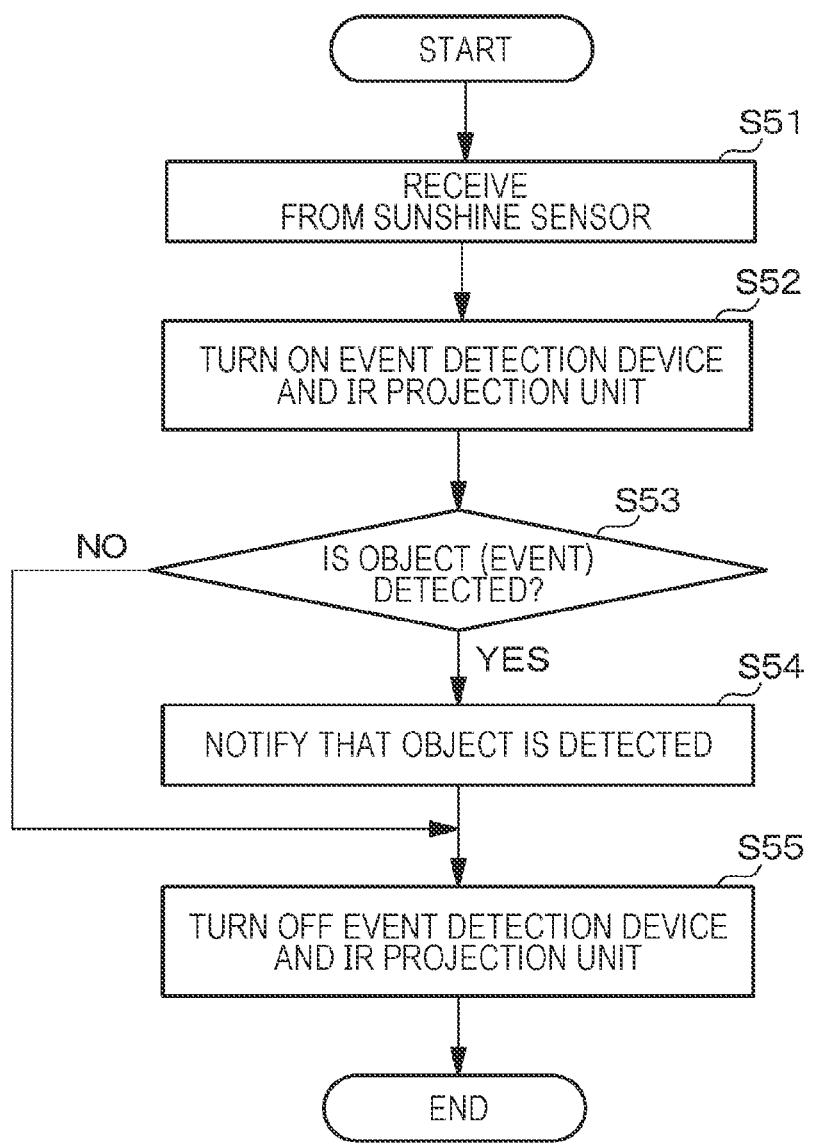

IMAGING SYSTEM, METHOD OF CONTROLLING IMAGING SYSTEM, AND OBJECT RECOGNITION SYSTEM

TECHNICAL FIELD

The present disclosure relates to an imaging system, a method of controlling the imaging system, and an object recognition system.

BACKGROUND ART

As one of event-driven imaging devices, there is an asynchronous imaging device called a dynamic vision sensor (DVS). The asynchronous imaging device can detect, as an event, that a luminance change of a pixel that photoelectrically converts incident light exceeds a predetermined threshold. Therefore, this type of asynchronous imaging device can also be referred to as an event detection device. In the related art, an event detection device is mounted on a vehicle and used as an event-based visual sensor that monitors a traveling road surface (for example, refer to Patent Document 1).

CITATION LIST

Patent Document

Patent Document 1: Japanese Patent Application Laid-Open No. 2013-79937

SUMMARY OF THE INVENTION

Problems to be Solved by the Invention

According to an event detection device mounted on a vehicle, it is possible to recognize an object such as a road surface while the vehicle is traveling. However, in the case of the event detection device, for example, since a pixel configuration including an event detection section is adopted for each pixel, a pixel size has to be larger than that of the synchronous imaging device, and a resolution is lower. Therefore, even when the event detection device can detect the presence of an object (occurrence of an event), the event detection device cannot accurately recognize an object of the event due to the low resolution.

Therefore, an object of the present disclosure is to provide an imaging system, a method of controlling an imaging system, and an object recognition system using the imaging system capable of more accurately performing object recognition of an event after detecting the event.

Solutions to Problems

According to an aspect of the present disclosure for achieving the above object, there is provided an imaging system mounted on and used in a moving body, the imaging system including:

an event detection device that detects, as an event, that a luminance change of a pixel that photoelectrically converts incident light exceeds a predetermined threshold;

an imaging device that captures an image at a fixed frame rate; and a control section that controls the event detection device and the imagine device, in which the control section performs control to acquire image information of a region including the event by the imaging device in response to the event detection device detecting the event.

Furthermore, according to another aspect of the present disclosure for achieving the above object, there is provided a method of controlling an imaging system including an event detection device that detects, as an event, that a luminance change of a pixel that photoelectrically converts incident light exceeds a predetermined threshold, and an imaging device that captures an image at a fixed frame rate, and the imaging system mounted on and used in a moving body, the method including:

acquiring image information of a region including the event by the imaging device when the event detection device detects the event.

Furthermore, according to still another aspect of the present disclosure for achieving the above object, there is provided an object recognition system mounted on and used in a moving body, the object recognition system including:

an event detection device that detects, as an event, that a luminance change of a pixel that photoelectrically converts incident light exceeds a predetermined threshold;

an imaging device that captures an image at a fixed frame rate; and a control section that controls the event detection device and the imaging device, in which under a control of the control section, after the event is detected by the event detection device, image information of a region including the event is acquired by the imaging device, and object recognition is performed based on the acquired image information.

BRIEF DESCRIPTION OF DRAWINGS

FIG. 13 is a block diagram illustrating an example of a system configuration of an object recognition system of the present disclosure.

FIG. 14 is a flowchart illustrating a flow of object recognition processing according to Example 1.

FIG. 22 is a flowchart illustrating a flow of a specific example 1 of an event detection processing at the time of IR light projection in an object recognition system according to Example 5.

MODE FOR CARRYING OUT THE INVENTION

Figure 1:
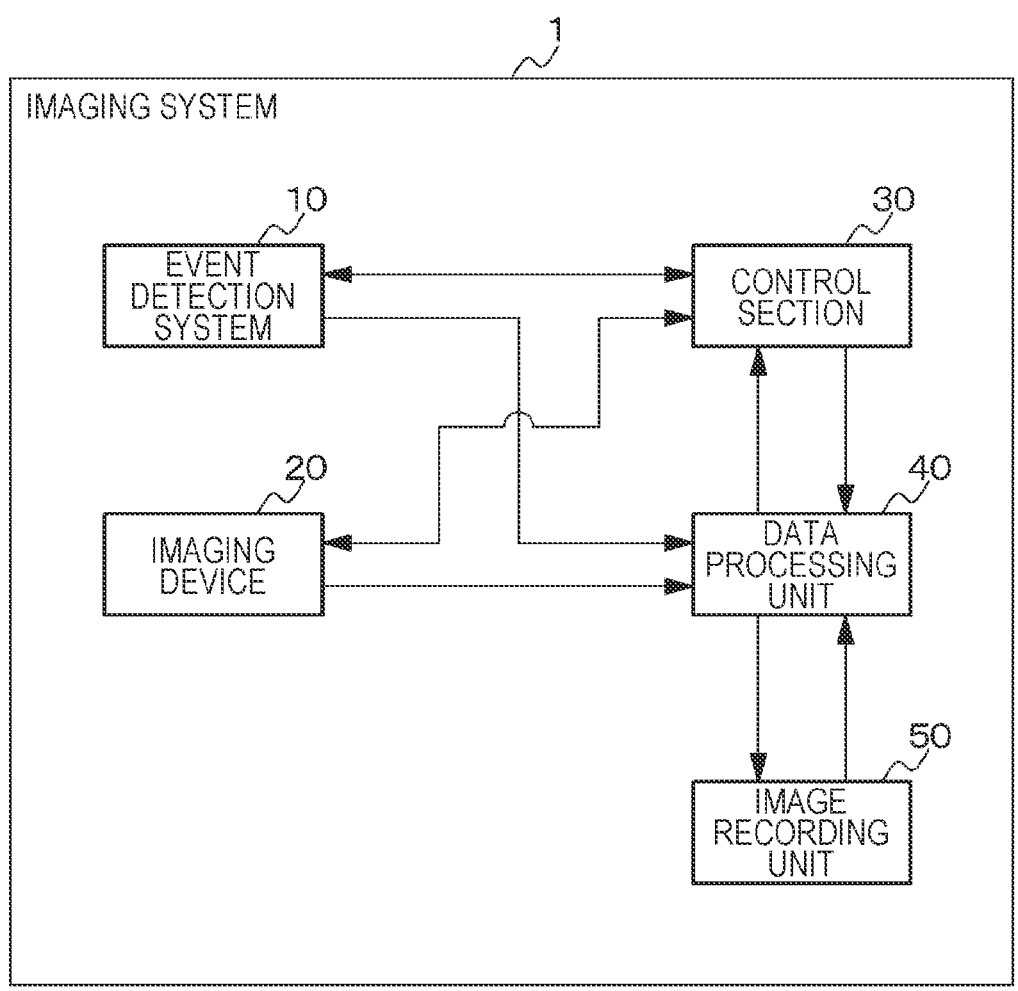
FIG. 1 is a block diagram illustrating an example of a system configuration of an imaging system of the present disclosure.

Hereinafter, modes (hereinafter, described as "embodiments") for carrying out a technology according to the present disclosure will be described in detail with reference to the drawings. The technology according to the present disclosure is not limited to the embodiments. In the following description, the same reference numerals will be used for the same elements or elements having the same functions, and redundant description will be omitted. Note that the description will be given in the following order.

1. General Description of Imaging system and Object Recognition System of Present Disclosure
2. Imaging System of Present Disclosure
2-1. Configuration Example of Imaging System
2-2. Configuration Example of Event Detection Device
2-2-1. Configuration Example of Pixel Array Unit
2-2-2. Configuration Example of Pixel
2-2-3. Configuration Example of Event Detection section
2-2-3-1. Configuration Example of Current-Voltage Conversion Unit
2-2-3-2. Configuration Example of Subtractor and Quantizer
2-2-4. Configuration Example of Chip Structure
2-3. Configuration Example of Imaging Device
2-3-1. Configuration Example of CMOS Image Sensor
2-3-2. Configuration Example of Pixel
2-3-3. Configuration Example of Chip Structure
2-3-3-1. Flat chip Structure (so-called Flat Structure)
2-3-3-2. Laminated Chip Structure (so-called Laminated Structure)
3. Object Recognition System of Present Disclosure
3-1. Configuration Example of Object Recognition System
3-2. Example 1 (Example of Basic Processing of Object Recognition Based on Event Detection)
3-3. Example 2 (Example of Detecting Damaged Portion of Road as Event)
3-4. Example 3 (Example of Changing Threshold for Event Detection According to Situation Outside Vehicle)
3-5. Example 4 (Example of Recognizing Surroundings of Host Vehicle by Imaging Device during Normal Travel)
3-6. Example 5 (Example in which Infrared Light is Self-emitted in Dark and Presence or Absence of Obstacle is Detected by Event Detection Device)
4. Modification Example
5. Application Example of Technology According to Present Disclosure
5-1. Application Example to Moving Body
6. Configuration that can be taken by Present Disclosure <<General Description of Imaging System and Object Recognition System of Present Disclosure>>

In an imaging system and an object recognition system of the present disclosure, an event detection device can acquire an image, and a control section can detect a state of a road surface based on the image acquired by the event detection device.

Furthermore, in the imaging system and the object recognition system of the present disclosure including the preferable configuration described above, the control section may divide the image acquired by the event detection device into regions, and detect the state of the road surface based on a state change amount per unit area obtained from an image obtained by the region division. Then, in a case where the number of regions in which the state change amount per unit area is equal to or more than a predetermined threshold is equal to or more than a predetermined set value, the control section may determine that a damaged portion exists on the road surface and notify a control system of the moving body of a determination result.

Furthermore, in the imaging system and the object recognition system of the present disclosure including the preferable configuration described above, the control section may be configured to perform control to dynamically change the threshold for determining the state of the road surface according to the situation outside the moving body. Then, the control section can be configured to determine the situation outside the moving body based on information given from an environment sensor attached to the moving body.

Furthermore, in the imaging system and the object recognition system of the present disclosure including the preferable configuration described above, in a case where a difference between a vehicle speed of a host vehicle and a vehicle speed of a monitoring target vehicle is equal to or more than a predetermined threshold in a state where surroundings are monitored based on the image acquired by the imaging device, the control section can configured to execute switching from imaging by the imaging device to imaging by the event detection device, and monitor the surroundings based on the image acquired by the event detection device. Then, in a case where a difference between the vehicle speed of the host vehicle and the vehicle speed of the monitoring target vehicle is less than the predetermined threshold in a state where the surroundings are monitored based on the image acquired by the event detection device, the control section can be configured to execute switching from the imaging by the imaging device and the imaging by the event detection device to the imaging by the imaging device.

Furthermore, the imaging system and the object recognition system of the present disclosure including the preferable configuration described above can include an infrared light projection unit that projects infrared light. In addition, the sunlight sensor may be provided, and the control section can be configured to turn on the infrared light projection unit by using information given from the sunlight sensor as a trigger.

Furthermore, in the imaging system and the object recognition system of the present disclosure including the preferable configuration described above, the event detection device may include a pixel having sensitivity to infrared light. Then, the event detection device can be configured to detect an event based on a luminance change of a pixel having sensitivity to infrared light in an environment where the infrared light is projected by the infrared light projection unit.

Furthermore, in the imaging system and the object recognition system of the present disclosure including the preferable configuration described above, in a case where the event detection device detects an event that does not change for a certain period of time, the control section can be configured to notify the control system of the moving body of a detection result. Then, the control section can be configured to turn off the infrared light projection unit in a case where the event detection device does not detect an event that does not change for a certain period of time when the infrared light projection unit is turned off.

Furthermore, in the imaging system and the object recognition system of the present disclosure including the preferable configuration described above, the control section can be configured to set an infrared light projection light amount of the infrared light projection unit according to brightness information given from the sunlight sensor. Then, the control section can be configured to adjust the infrared light projection light amount of the infrared light projection unit in multiple stages according to the brightness information given from the sunlight sensor.

<<Imaging System of Present Disclosure>>
<Configuration Example of Imaging System>

FIG. 1 is a block diagram illustrating an example of a system configuration of the imaging system of the present disclosure.

As illustrated in FIG. 1, an imaging system 1 of the present disclosure includes an event detection device 10, an imaging device 20, a control section 30, a data processing unit 40, and an image recording unit 50.

As the event detection device 10, an asynchronous imaging device called DVS that detects, as an event, that a luminance change of a pixel that photoelectrically converts incident light exceeds a predetermined threshold can be used. The asynchronous imaging device is an imaging device that detects an event asynchronously with a vertical synchronization signal with respect to a synchronous imaging device that captures an image in synchronization with the vertical synchronization signal. Details of the event detection device 10 including the asynchronous imaging device will be described later.

The imaging device 20 can use the synchronous imaging device that performs imaging at a fixed frame rate in synchronization with the vertical synchronization signal and outputs image data in a frame format. Examples of the synchronous imaging device include a complementary metal oxide semiconductor (CMOS) image sensor, a charge coupled device (CCD) image sensor, and the like. Details of the imaging device 20 including the synchronous imaging device will be described later.

The control section 30 includes, for example, a processor (CPU), and controls the event detection device 10, the imaging device 20, and the data processing unit 40. More specifically, in response to the event detection device 10 detecting an event, the control section 30 performs control to acquire image information of a region including the event by the imaging device 20.

Under the control of the control section 30, the data processing unit 40 performs predetermined data processing on event data indicating occurrence of an event output from the event detection device 10 and image data output from the imaging device 20. The control section 30 can know that the event detection device 10 has detected the event through the data processing unit 40. The image recording unit 50 records the image data processed by the data processing unit 40.

In the imaging system 1 having the above configuration, the event detection device 10 including the asynchronous imaging device generally has a pixel size larger than that of the synchronous imaging device 20, and thus, has a lower resolution than that of the imaging device 20 that captures an image at the fixed frame rate. On the other hand, the imaging device 20 including the synchronous imaging device is excellent in resolution as compared with the asynchronous imaging device.

Details of the event detection device 10 and the imaging device 20 will be described below.

<Configuration Example of Event Detection Device>

Figure 2:
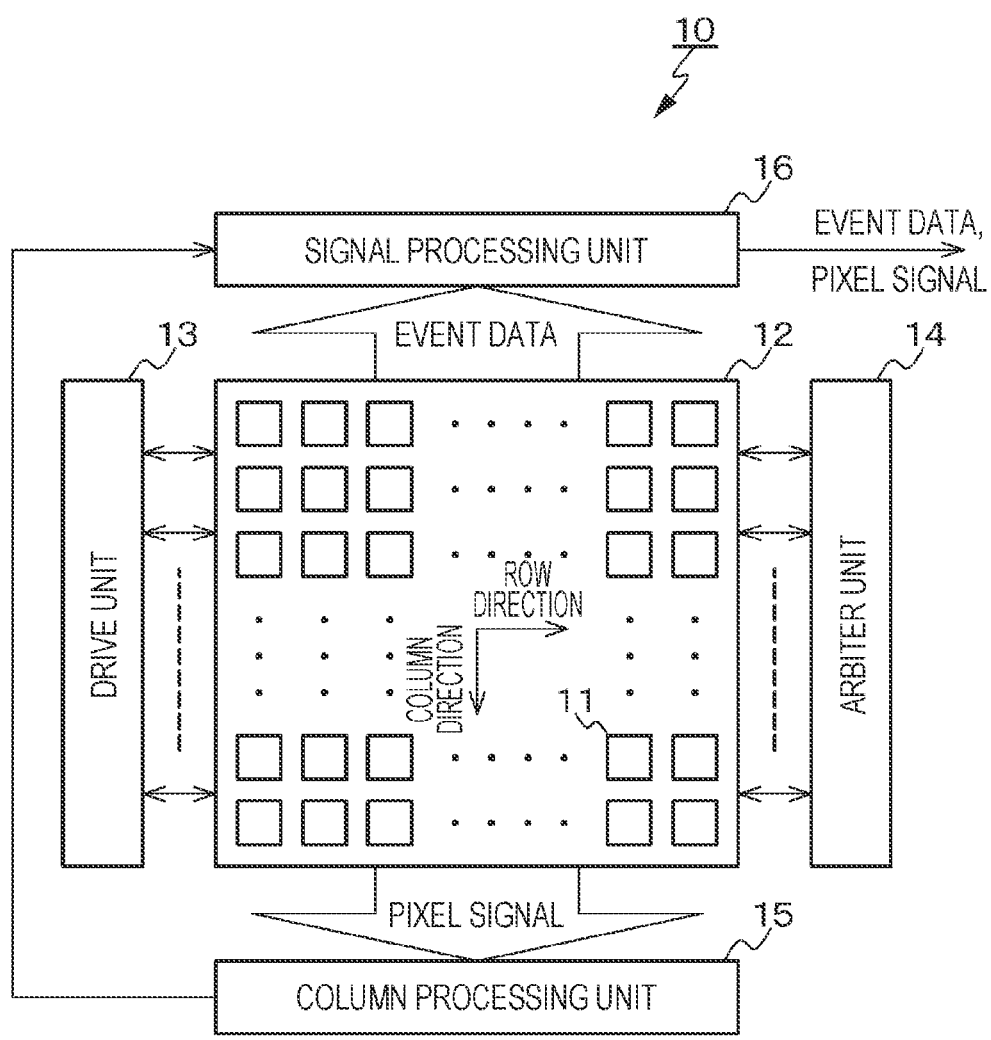
FIG. 2 is a block diagram illustrating an example of a configuration of an event detection device in the imaging system of the present disclosure.

FIG. 2 is a block diagram illustrating an example of a configuration of the event detection device 10 in the imaging system 1 of the present disclosure having the above-described configuration.

As illustrated in FIG. 2, the event detection device 10 includes a pixel array unit 12 in which a plurality of pixels 11 is two-dimensionally arranged in a matrix (array). Each of the plurality of pixels 11 generates, as a pixel signal, an analog signal of a voltage corresponding to a photocurrent as an electric signal generated by photoelectric conversion. Furthermore, each of the plurality of pixels 11 detects the presence or absence of the event based on whether or not a change exceeding a predetermined threshold has occurred in the photocurrent according to the luminance of the incident light. In other words, each of the plurality of pixels 11 detects that the luminance change exceeds the predetermined threshold as an event.

In addition to the pixel array unit 12, the event detection device 10 includes a drive unit 13, an arbiter unit (arbitration unit) 14, a column processing unit 15, and a signal processing unit 16 as a peripheral circuit unit of the pixel array unit 12.

When detecting the event, each of the plurality of pixels 11 outputs a request for requesting an output of event data indicating the occurrence of the event to the arbiter unit 14. Then, in a case where each of the plurality of pixels 11 receives a response indicating permission for output of the event data from the arbiter unit 14, the pixel outputs the event data to the drive unit 13 and the signal processing unit 16. Furthermore, the pixel 11 that has detected the event outputs an analog pixel signal generated by photoelectric conversion to the column processing unit 15.

The drive unit 13 drives each pixel 11 of the pixel array unit 12. For example, the drive unit 13 detects the event, drives the pixel 11 that has output the event data, and outputs an analog pixel signal of the pixel 11 to the column processing unit 15.

The arbiter unit 14 arbitrates a request for requesting the output of the event data supplied from each of the plurality of pixels 11, and transmits a response based on the arbitration result (permission/non-permission of the output of the event data) and a reset signal for resetting the event detection to the pixel 11.

The column processing unit 15 includes, for example, an analog-digital conversion unit including a set of analog-digital converters provided for each pixel column of the pixel array unit 12. As the analog-digital converter, for example, a single-slope analog-digital converter can be exemplified.

In the column processing unit 15, for each pixel column of the pixel array unit 12, processing of converting an analog pixel signal output from the pixel 11 in the column into a digital signal is performed. The column processing unit 15 can also perform correlated double sampling (CDS) processing on the digitized pixel signal.

The signal processing unit 16 performs predetermined signal processing on the digitized pixel signal supplied from the column processing unit 15 and the event data output from the pixel array unit 12, and outputs the event data and the pixel signal after the signal processing.

As described above, the change in the photocurrent generated in the pixel 11 can also be regarded as a light amount change (luminance change) of the light incident on the pixel 11. Therefore, it can also be said that the event is a light amount change (luminance change) of the pixel 11 exceeding the predetermined threshold. The event data indicating the occurrence of the event includes at least position information such as coordinates indicating the position of the pixel 11 in which the light amount change as the event has occurred. The event data can include a polarity of the light amount change in addition to the position information.

For a series of event data output at a timing when an event occurs from the pixel 11, as long as an interval between the pieces of event data is maintained at the time when the event occurs, it can be said that the event data implicitly includes time information indicating a relative time when the event occurs. However, when the interval between the event data is not maintained as it is at the time of occurrence of the event due to the event data being stored a memory and the like, the time information implicitly included in the event data is lost. Therefore, before the interval between the pieces of event data is not maintained as it is at the time of occurrence of the event, the signal processing unit 16 includes time information indicating the relative time at which the event has occurred, such as a time stamp, in the event data.

[Configuration Example of Pixel Array Unit]

Figure 3:
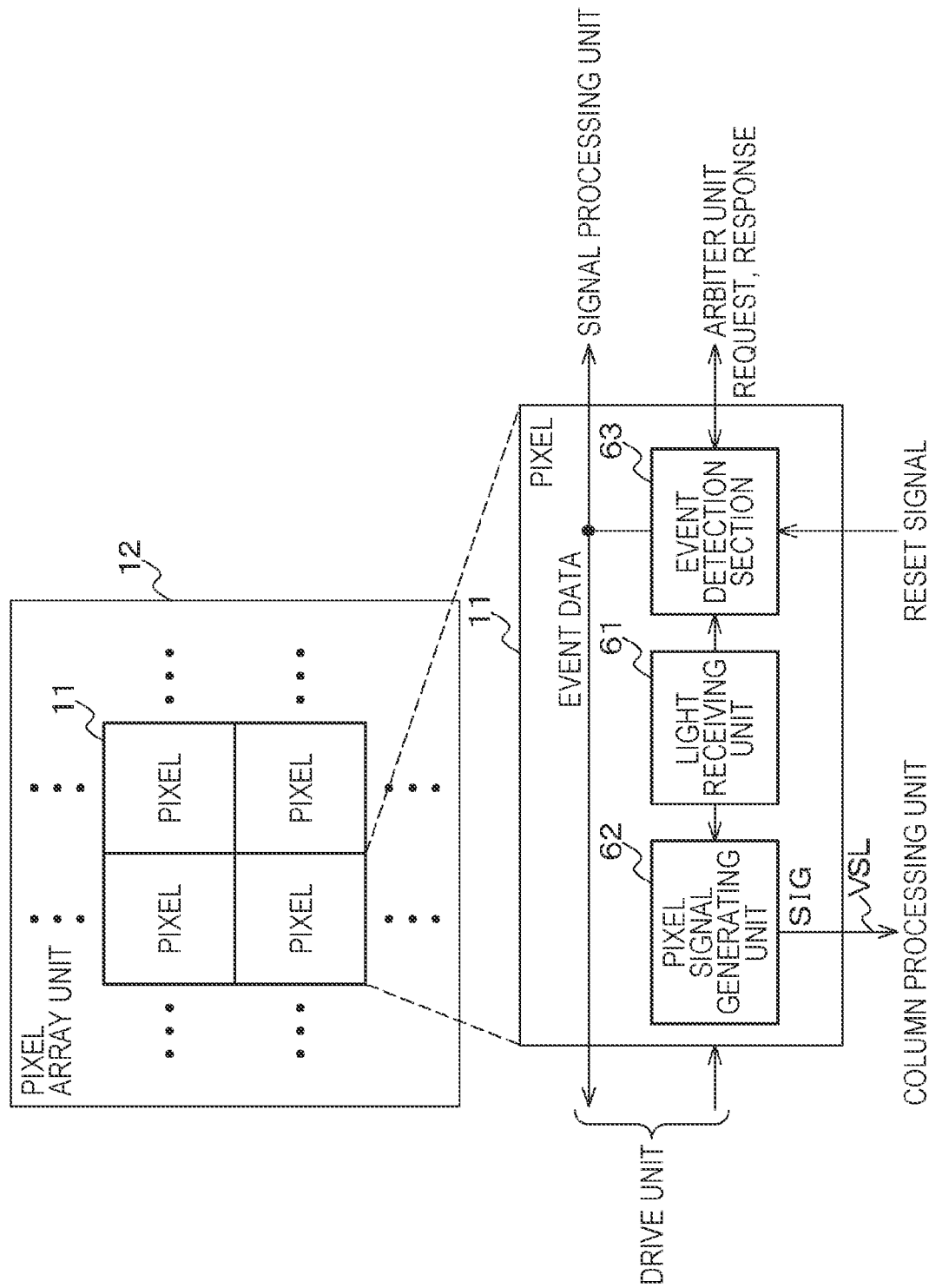
FIG. 3 is a block diagram illustrating an example of a configuration of a pixel array unit in the event detection device.

FIG. 3 is a block diagram illustrating an example of a configuration of the pixel array unit 12 in the event detection device 10.

In the pixel array unit 12 in which the plurality of pixels 11 is two-dimensionally arranged in a matrix, each of the plurality of pixels 11 includes a light receiving unit 61, a pixel signal generation unit 62, and an event detection section 63.

In the pixel 11 having the above configuration, the light receiving unit 61 photoelectrically converts the incident light to generate a photocurrent. Then, under the control of the drive unit 13 (refer to FIG. 2), the light receiving unit 61 supplies a signal of a voltage corresponding to the photocurrent generated by photoelectrically converting the incident light to either the pixel signal generation unit 62 or the event detection section 63.

The pixel signal generation unit 62 generates a signal of a voltage corresponding to the photocurrent supplied from the light receiving unit 61 as an analog pixel signal SIG. Then, the pixel signal generation unit 62 supplies the generated analog pixel signal SIG to the column processing unit 15 (refer to FIG. 2) via a vertical signal line VSL wired for each pixel column of the pixel array unit 12.

The event detection section 63 detects whether or not an event has occurred based on whether or not the change amount of the photocurrent from each of the light receiving units 61 exceeds a predetermined threshold. The event includes, for example, an on-event indicating that the change amount of the photocurrent exceeds an upper limit threshold and an off-event indicating that the change amount falls below a lower limit threshold. In addition, the event data indicating the occurrence of the event includes, for example, one bit indicating a detection result of an on-event and one bit indicating a detection result of an off-event. Note that the event detection section 63 can be configured to detect only an on-event.

When an event occurs, the event detection section 63 outputs a request for requesting the output of event data indicating the occurrence of the event to the arbiter unit 14 (refer to FIG. 2). Then, in a case where a response to the request is received from the arbiter unit 14, the event detection section 63 outputs the event data to the drive unit 13 and the signal processing unit 16.

[Exemplary Circuit Configuration of Pixel]

Figure 4:
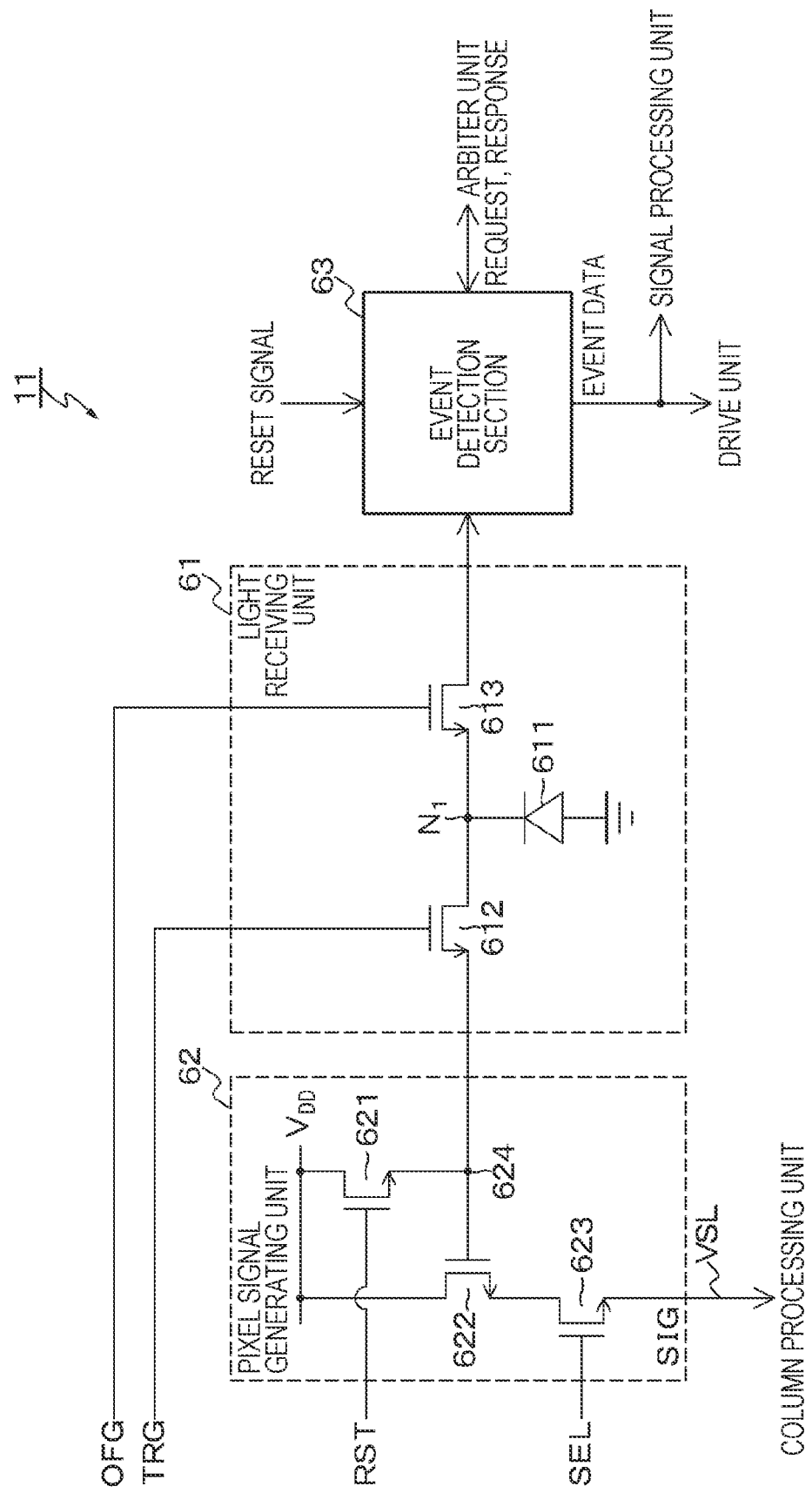
FIG. 4 is a circuit diagram illustrating an example of a circuit configuration of a pixel in the event detection device.

FIG. 4 is a circuit diagram illustrating an example of a circuit configuration of the pixel 11 of the pixel array unit 12 in the event detection device 10.

As described above, each of the plurality of pixels 11 includes the light receiving unit 61, the pixel signal generation unit 62, and the event detection section 63.

In the pixel 11 having the above configuration, the light receiving unit 61 includes a light receiving element (photoelectric conversion element) 611, a transfer transistor 612, and a transfer transistor 613. As the transfer transistor 612 and the transfer transistor 613, for example, an N-type metal oxide semiconductor (MOS) transistor can be used. The transfer transistor 612 and the transfer transistor 613 are connected in series to each other.

The light receiving element 611 is connected between the common connection node $N_1$ between the transfer transistor 612 and the transfer transistor 613 and the ground, and photoelectrically converts incident light to generate a charge of a charge amount corresponding to the light amount of incident light.

A transfer signal TRG is supplied from the drive unit 13 illustrated in FIG. 2 to a gate electrode of the transfer transistor 612. The transfer transistor 612 is turned on in response to the transfer signal TRG, and thus, supplies an electric signal generated by photoelectric conversion by the light receiving element 611 to the pixel signal generation unit 62.

A control signal OFG is supplied from the drive unit 13 to a gate electrode of the transfer transistor 613. The transfer transistor 613 is turned on in response to the control signal OFG, and thus, supplies an electric signal generated by photoelectric conversion by the light receiving element 611 to the event detection section 63. The electric signal supplied to the event detection section 63 is a photocurrent including charges.

The pixel signal generation unit 62 includes a reset transistor 621, an amplification transistor 622, a selection transistor 623, and a floating diffusion layer 624. As the reset transistor 621, the amplification transistor 622, and the selection transistor 623, for example, N-type MOS transistors can be used.

The charge photoelectrically converted by the light receiving element 611 of the light receiving unit 61 is supplied to the pixel signal generation unit 62 by the transfer transistor 612. The charge supplied from the light receiving unit 61 is accumulated in the floating diffusion layer 624. The floating diffusion layer 624 generates a voltage signal having a voltage value corresponding to the charge amount of the accumulated charge. That is, the floating diffusion layer 624 is a charge-voltage conversion unit that converts a charge into a voltage.

The reset transistor 621 is connected between a power supply line of a power supply voltage $V_{DD}$ and the floating diffusion layer 624. A reset signal RST is supplied from the drive unit 13 to a gate electrode of the reset transistor 621. The reset transistor 621 is turned on in response to the reset signal RST, and thus, initialize (reset) the floating diffusion layer 624.

The amplification transistor 622 is connected in series with the selection transistor 623 between the power supply line of the power supply voltage $V_{DD}$ and the vertical signal line VSL. The amplification transistor 622 amplifies the voltage signal subjected to charge-voltage conversion by the floating diffusion layer 624.

A selection signal SEL is supplied from the drive unit 13 to a gate electrode of the selection transistor 623. The selection transistor 623 is turned on in response to the selection signal SEL, and thus, outputs the voltage signal amplified by the amplification transistor 622 as an analog pixel signal SIG to the column processing unit 15 (refer to FIG. 2) via the vertical signal line VSL.

In the event detection device 10 including the pixel array unit 12 in which the pixels 11 having the above-described configuration are two-dimensionally arranged, the drive unit 13 is instructed to start event detection by the control section 30 illustrated in FIG. 1. Then, when the start of the event detection is instructed, the drive unit 13 supplies the control signal OFG to the transfer transistor 613 of the light receiving unit 61 to drive the transfer transistor 613, and supplies the photocurrent corresponding to the charge generated in the light receiving element 611 to the event detection section 63.

Then, when an event is detected in a certain pixel 11, the drive unit 13 turns of the transfer transistor 613 of the pixel 11 to stop the supply of photocurrent to the event detection section 63. Next, the drive unit 13 drives the transfer transistor 612 by supplying the transfer signal TRG to the transfer transistor 612, and transfers the charge photoelectrically converted by the light receiving element 611 to the floating diffusion layer 624.

In this way, the event detection device 10 including the pixel array unit 12 in which the pixels 11 having the above-described configuration are two-dimensionally arranged outputs only the pixel signal of the pixel 11 in which the event is detected to the column processing unit 15. Therefore, it is possible to reduce power consumption of the event detection device 10 and a processing amount of the image processing as compared with a case of outputting the pixel signals of all the pixels regardless of the presence or absence of the event.

Note that the configuration of the pixel 11 exemplified here is an example, and is not limited to this configuration example. For example, in a case where it is not necessary to output a pixel signal, a pixel configuration not including the pixel signal generation unit 62 can be adopted. In the case of this pixel configuration, the transfer transistor 612 may be omitted in the light receiving unit 61. Furthermore, the column processing unit 15 in FIG. 2 can be configured not to have an analog-digital conversion function. The pixel configuration that does not output the pixel signal can suppress a scale of the event detection device 10.

[Configuration Example of Event Detection Section]

Figure 5:
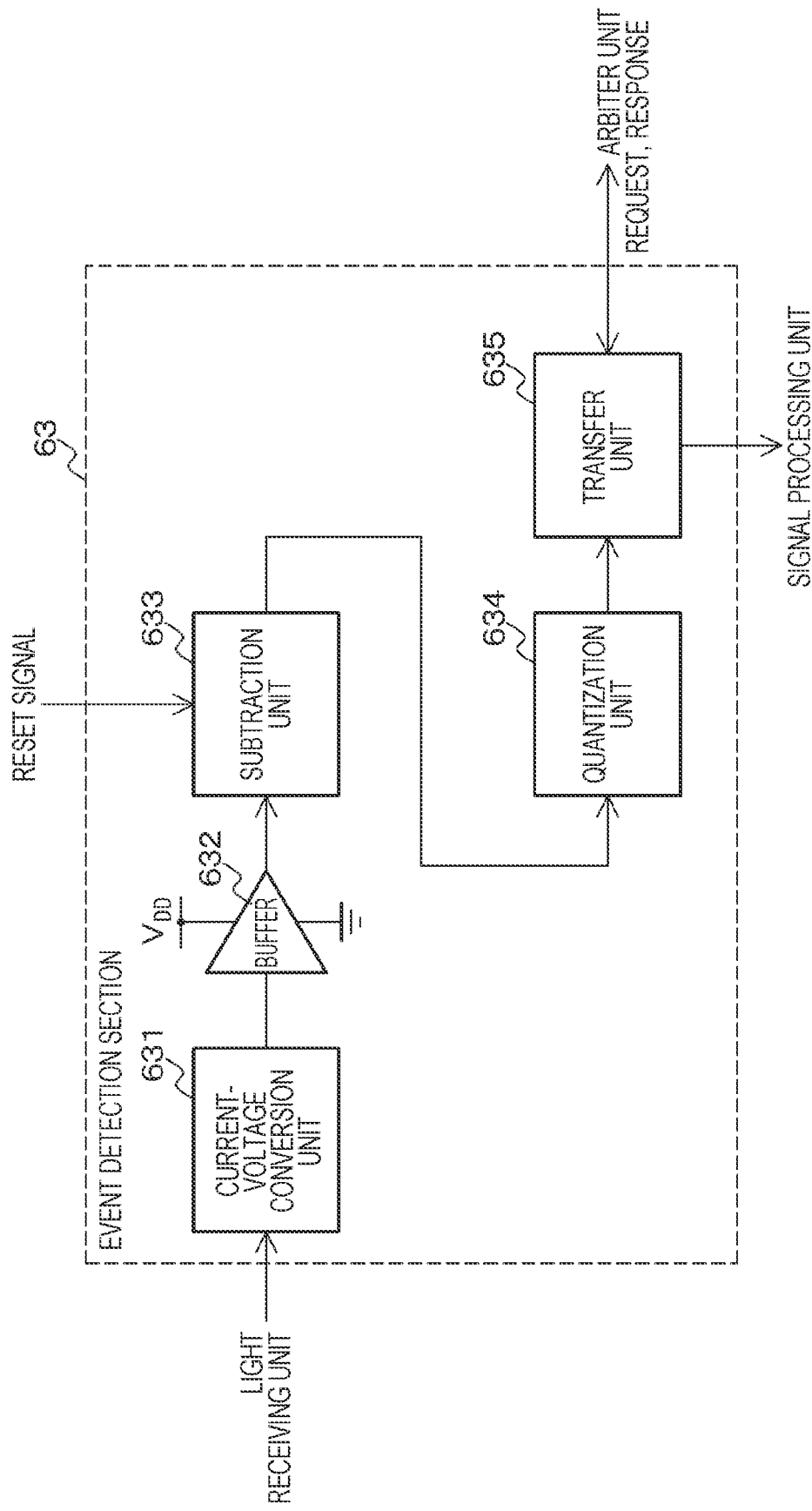
FIG. 5 is a block diagram illustrating an example of a circuit configuration of an event detection section in the pixel of the event detection device.

FIG. 5 is a block diagram illustrating an example of a circuit configuration of the event detection section 63 in the pixel 11 of the event detection device 10.

As illustrated in FIG. 5, the event detection section 63 according to the present example includes a current-voltage conversion unit 631, a buffer 632, a subtractor 633, a quantizer 634, and a transfer unit 635.

The current-voltage conversion unit 631 converts the photocurrent supplied from the light receiving unit 63 of the pixel 11 into a voltage signal (hereinafter, it may be described as a "photovoltage") of a logarithm of the photocurrent, and supplies the converted voltage signal to the buffer 632. The buffer 632 buffers the photovoltage supplied from the current-voltage conversion unit 631 and supplies the photovoltage to the subtractor 633.

The subtractor 633 calculates a difference between a current photovoltage and a photovoltage different from the current photovoltage by a minute time, and supplies a difference signal corresponding to the difference to the quantizer 634. The quantizer 634 quantizes the difference signal supplied from the subtractor 633 into a digital signal and supplies a digital value of the difference signal to the transfer unit 635.

When the digital value of the difference signal is supplied from the quantizer 634, the transfer unit 635 supplies a request for requesting transmission of the event data to the arbiter unit 14. Then, when receiving a response to the request, that is, a response indicating that the output of the event data is permitted, from the arbiter unit 14, the transfer unit 635 supplies the event data to the drive unit 13 and the signal processing unit 16 according to the digital value of the difference signal supplied from the quantizer 634.

Next, configuration examples of the current-voltage conversion unit 631, the subtractor 633, and the quantizer 634 in the event detection section 63 will be described.

(Configuration Example of Current-Voltage Conversion Unit)

Figure 6:
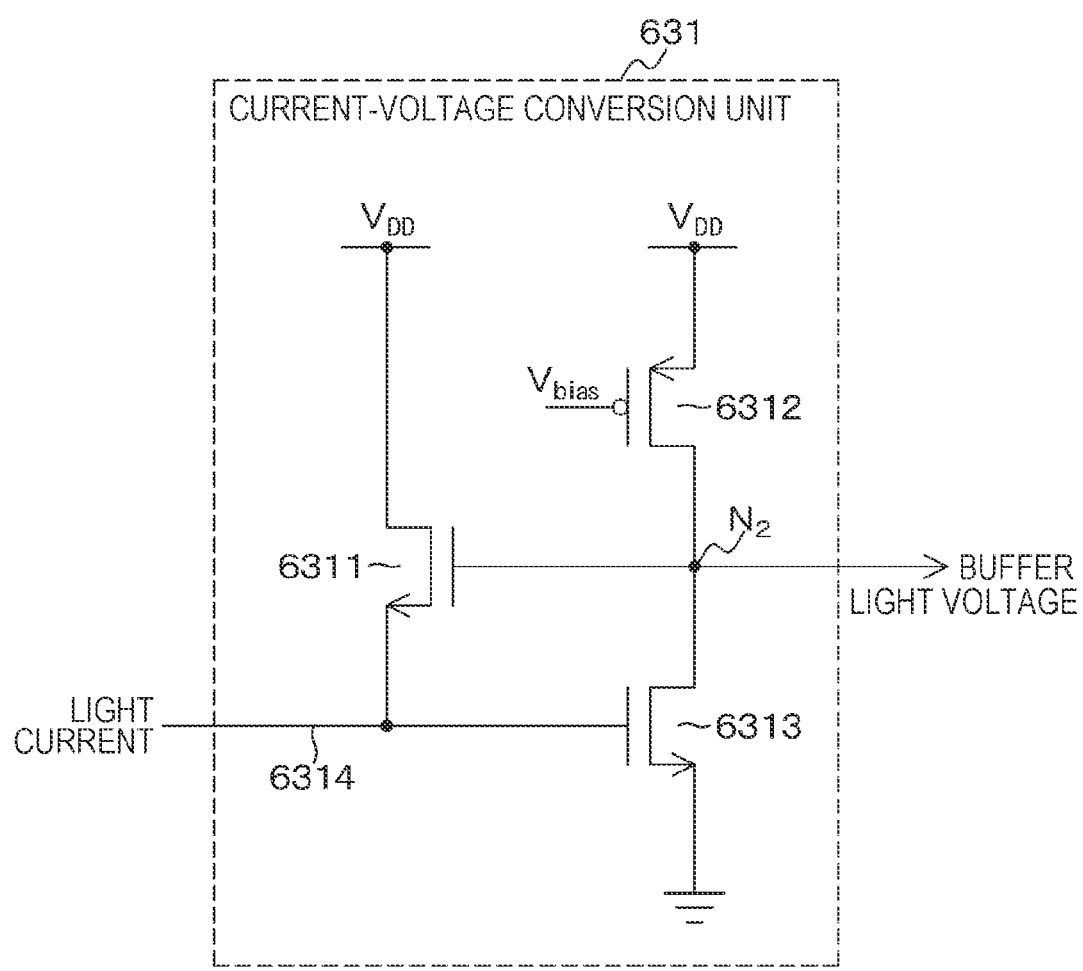
FIG. 6 is a circuit diagram illustrating an example of a configuration of a current-voltage conversion unit in the event detection section.

FIG. 6 is a circuit diagram illustrating an example of a configuration of the current-voltage conversion unit 631 in the event detection section 63.

As illustrated in FIG. 6, the current-voltage conversion unit 631 according to the present example has a circuit configuration including a transistor 6311, a transistor 6312, and a transistor 6313. An N-type MOS transistor can be used as the transistor 6311 and the transistor 6313, and a P-type MOS transistor can be used as the transistor 6312.

The transistor 6311 is connected between the power supply line of the power supply voltage $V_{DD}$ and a signal input line 6314. The transistor 6312 and the transistor 6313 are connected in series between the power supply line of the power supply voltage $V_{DD}$ and the ground. Then, a common connection node $N_2$ of the transistor 6312 and the transistor 6313 is connected to a gate electrode of the transistor 6311 and an input terminal of the buffer 632 illustrated in FIG. 5.

A predetermined bias voltage $V_{bias}$ applied to a gate electrode of the transistor 6312. Therefore, the transistor 6312 supplies a constant current to the transistor 6313. A photocurrent is input from the light receiving unit 61 to the gate electrode of the transistor 6313 through the signal input line 6314.

A drain electrode of the transistor 6311 is connected to a power supply line of the power supply voltage $V_{DD}$, and has a source follower configuration. A gate electrode of the transistor 6313 is connected to a source electrode of the transistor 6311. Then, the photocurrent from the light receiving unit 61 is converted into a photovoltage corresponding to the logarithm of the photocurrent by the transistor 6311 and the transistor 6313 having the source follower configuration.

(Configuration Examples of Subtractor and Quantizer)

Figure 7:
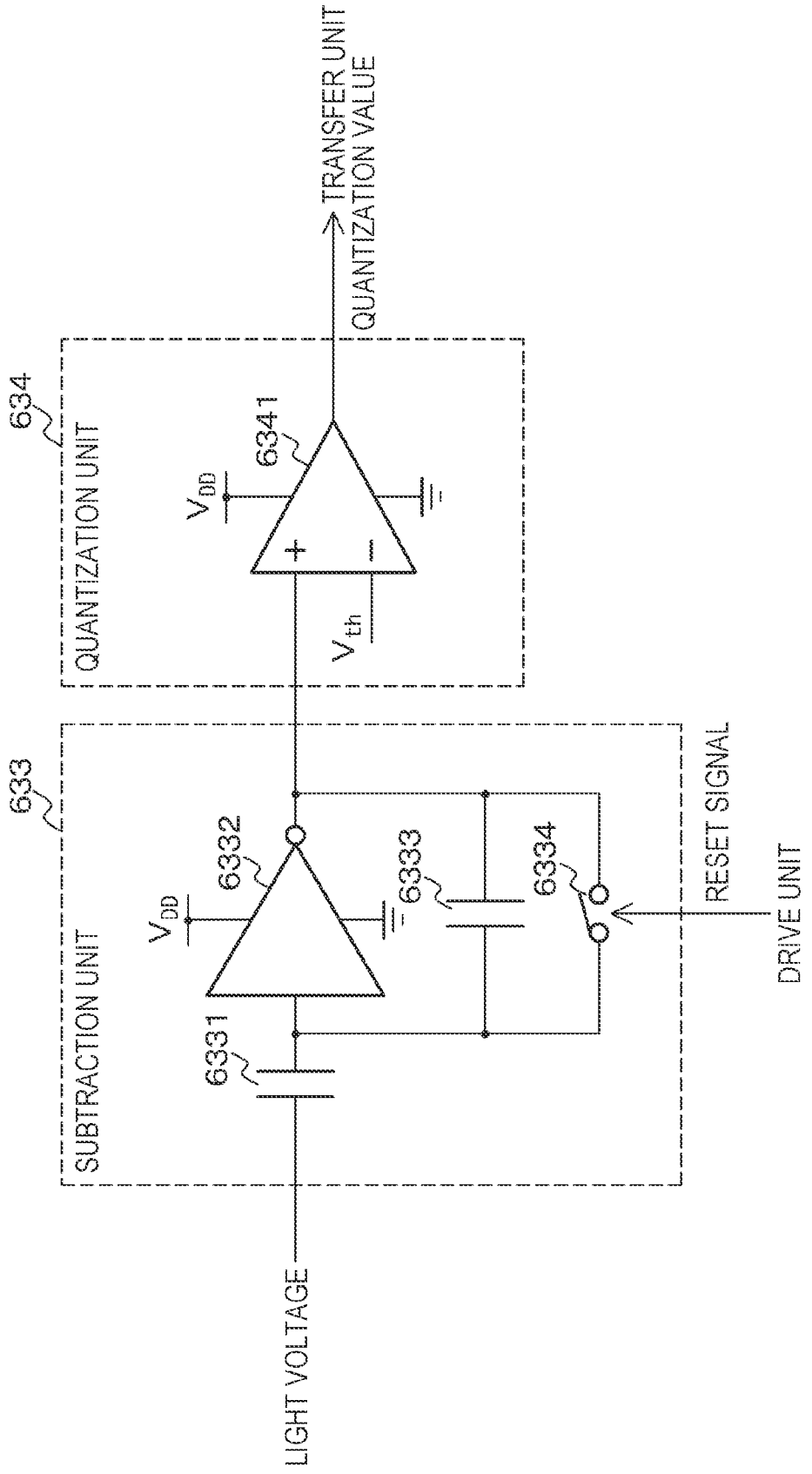
FIG. 7 is a circuit diagram illustrating examples of configurations of a subtractor and a quantizer in the event detection section.

FIG. 7 is a circuit diagram illustrating an example of configurations of the subtractor 633 and the quantizer 634 in the event detection section 63.

The subtractor 633 according to the present example includes a capacitive element 6331, an operational amplifier 6332, a capacitive element 6333, and a switch element 6334.

One end of the capacitive element 6331 is connected to an output terminal of the buffer 632 illustrated in FIG. 5, and the other end of the capacitive element 6331 is connected to an input terminal of the operational amplifier 6332. Therefore, the photovoltage supplied from the buffer 632 is input to the input terminal of the operational amplifier 6332 via the capacitive element 6331.

The capacitive element 6333 is connected in parallel to the operational amplifier 6332. The switch element 6334 is connected between both ends of the capacitive element 6333. A reset signal is supplied to the switch element 6334 from the arbiter unit 14 illustrated in FIG. 2 as a control signal for opening and closing the switch element 6334. The switch element 6334 opens and closes a path connecting both ends of the capacitive element 6333 in response to the reset signal.

In the subtractor 633 having the above configuration, when the switch element 6334 is turned on (closed), the photovoltage input to the terminal of the capacitive element 6331 on the buffer 632 side is $V_{init}$. When the photovoltage $V_{init}$ is input to the terminal of the capacitive element 6331 on the buffer 632 side, the terminal on the opposite side becomes a virtual ground terminal. A potential of the virtual ground terminal is set to zero for convenience. At this time, assuming that a capacitance value of the capacitive element 6331 is $C_1$, a charge $Q_{init}$ accumulated in the capacitive element 6331 is expressed by the following Equation (1).

$$Q_{init} = C_1 \times V_{init} \quad (1)$$

Furthermore, in a case where the switch element 6334 is open, both ends of the capacitive element 6333 are short-circuited, and thus, the charge accumulated in the capacitive element 6333 becomes zero. Thereafter, the switch element 6334 is turned off (opened). The photovoltage of the terminal of the capacitive element 6331 on the buffer 632 side in a case where the switch element 6334 is turned off state is represented as $V_{after}$. A charge $Q_{after}$ accumulated in the capacitive element 6331 in a case where the switch element 6334 is turned off is expressed by the following Equation (2).

$$Q_{after} = C_1 \times V_{after} \quad (2)$$

When the capacitance value of the capacitive element 6333 is represented as $C_2$ and the output voltage of the operational amplifier 6332 is represented as $V_{out}$, the charge $Q_2$ accumulated in the capacitive element 6333 is expressed by the following Equation (3).

$$Q_2 = -C_2 \times V_{out} \quad (3)$$

Before and after the switch element 6334 is turned off, the total charge amount obtained by combining the charge amount of the capacitive element 6331 and the charge amount of the capacitive element 6333 does not change, and thus, the following equation (4) is established.

$$Q_{init} = Q_{after} + Q_2 \quad (4)$$

When Expressions (1) to (3) are substituted into Expression (4), the following Equation (5) is obtained.

$$V_{out} = -(C_1/C_2) \times (V_{after} - V_{init}) \quad (5)$$

According to Equation (5), the subtractor 633 subtracts the photovoltage $V_{init}$ from the photovoltage $V_{after}$, that is, calculates the difference signal $V_{out}$ corresponding to the difference ($V_{init} - V_{after}$) between the photovoltage $V_{init}$ and the photovoltage $V_{after}$. Furthermore, according to Equation (5), the gain of subtraction by the subtractor 633 is $C_1/C_2$. Normally, since it is desired to maximize the gain of subtraction of the subtractor 633, it is preferable to design the capacitance value $C_1$ of the capacitive element 6331 to be large and the capacitance value $C_2$ of the capacitive element 6333 to be small.

On the other hand, when the capacitance value $C_2$ of the capacitive element 6333 is too small, kTC noise increases, and noise characteristics may deteriorate. Therefore, the capacitance reduction of the capacitance value $C_2$ of the capacitive element 6333 is limited to a range in which noise can be tolerated. Furthermore, since the event detection section 63 including the subtractor 633 is mounted for each pixel 11, the capacitive element 6331 and the capacitive element 6333 have area restrictions. In consideration of these, the capacitance value $C_1$ of the capacitive element 6331 and the capacitance value $C_2$ of the capacitive element 6333 are determined.

In FIG. 7, the quantizer 634 includes a comparator 6341. The comparator 6341 receives the difference signal (that is, the output signal of the operational amplifier 6332) from the subtractor 430 as a non-inverting (+) input, and receives the predetermined threshold voltage $V_{th}$ as an inverting (−) input. Then, the comparator 6341 compares the difference signal $V_{out}$ from the subtractor 430 with a predetermined threshold voltage $V_{th}$, and outputs a high level or a low level representing the comparison result to the transfer unit 635 illustrated in FIG. 5 as the quantization value of the difference signal $V_{out}$.

In a case where it is recognized from the quantized value of the difference signal $V_{out}$ from the quantizer 634 that a light amount change (luminance change) as an event has occurred, that is, in a case where the difference signal $V_{out}$ is larger than a predetermined threshold voltage $V_{th}$ (or small), the transfer unit 635 outputs, for example, high-level event data indicating the occurrence of the event to the signal processing unit 16 in FIG. 2. That is, the threshold voltage $V_{th}$ is a threshold for detecting an event based on a light amount change (luminance change) of the pixel 11.

The signal processing unit 16 outputs the event data supplied from the transfer unit 635 including position information of the pixel 11 that has detected the event indicated by the event data, time information indicating the time which the event has occurred, and further the polarity information of the light amount change as the event as necessary.

As a data format of the event data including the position information of the pixel 11 in which the event has been detected, the time information indicating the time when the event has occurred, and the polarity information of the light amount change as the event, for example, a data format called an address event representation (AER) can be adopted.

Note that, in the pixel 11, arbitrary light can be received as the incident light by providing an optical filter that transmits predetermined light such as a color filter, and the like. For example, in a case where visible light is received as incident light in the pixel 11, the event data represents occurrence of a change in a pixel value in an image in which a visible subject appears. Furthermore, for example, in a case where the pixel 11 receives infrared rays, millimeter waves, and the like for distance measurement as incident light, the event data indicates occurrence of a change in the distance to the subject. Moreover, for example, in a case where infrared rays for measuring the temperature are received as incident light in the pixel 11, the event data indicates occurrence of a change in the temperature of the subject. In the present embodiment, the pixel 11 receives visible light as incident light.

[Configuration Example of Chip Structure]

Figure 8:
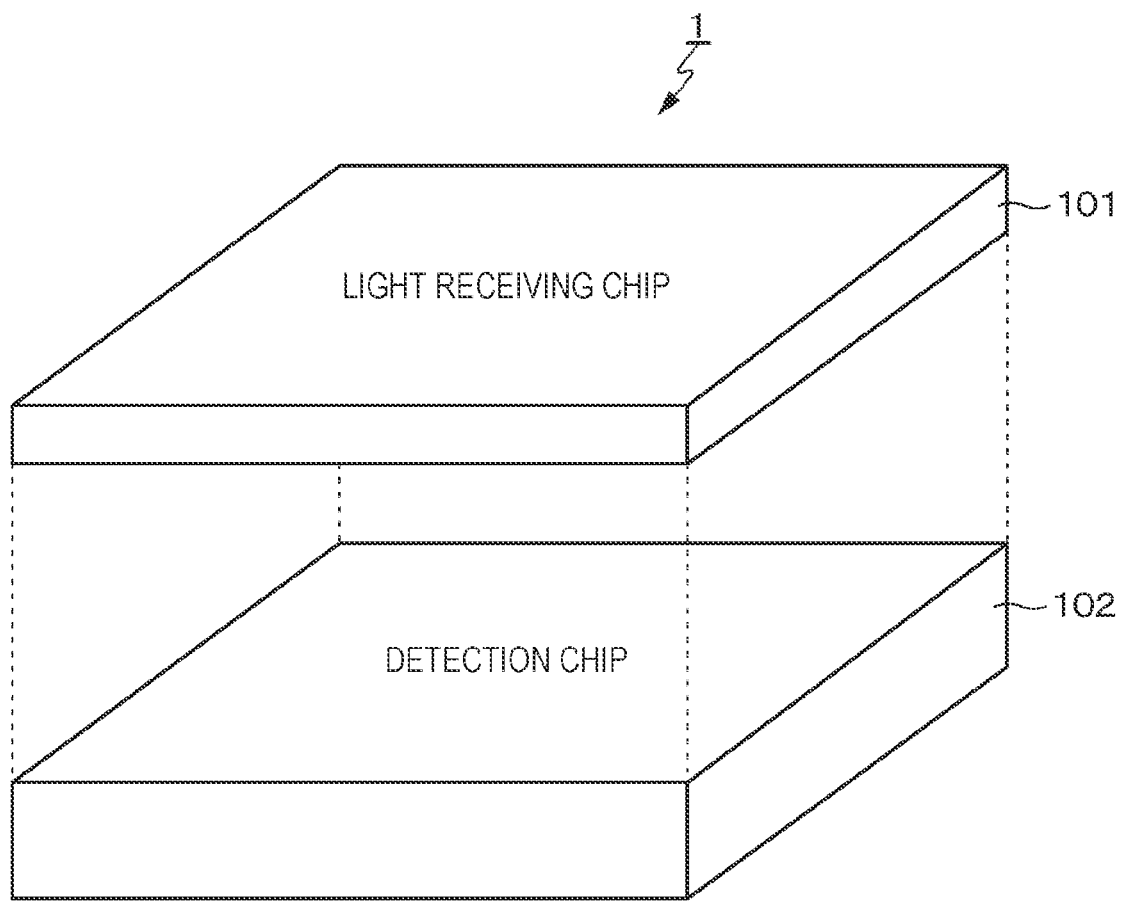
FIG. 8 is an exploded perspective view schematically illustrating a laminated chip structure of the event detection device.

As a chip (semiconductor integrated circuit) structure of the event detection device 10 described above, for example, a laminated chip structure can be adopted. FIG. 8 is an exploded perspective view schematically illustrating a laminated chip structure of the event detection device 10.

As illustrated in FIG. 8, the laminated chip structure, that is, the laminated structure has a structure in which at least two chips of a light receiving chip 101 which is a first chip and a detection chip 102 which is a second chip are laminated. Then, in the circuit configuration of the pixel 11 illustrated in FIG. 4, the light receiving elements 611 are arranged on the light receiving chip 101, and all elements other than the light receiving element 611, elements of other circuit portions of the pixel 11, and the like are arranged on the detection chip 102. The light receiving chip 101 and the detection chip 102 are electrically connected via a connection portion such as a via (VIA), Cu—Cu bonding, or a bump.

Note that, here, a configuration example in which the light receiving element 611 is disposed on the light receiving chip 101, and elements other than the light receiving element 611, elements of other circuit portions of the pixel 11, and the like are disposed on the detection chip 102 has been exemplified, but the present invention is not limited to this configuration example.

For example, in the circuit configuration of the pixel 11 illustrated in FIG. 4, each element of the light receiving unit 61 may be disposed on the light receiving chip 101, and elements other than the light receiving unit 61, elements of other circuit portions of the pixel 11, and the like may be disposed on the detection chip 102. Furthermore, each element of the light receiving unit 61, and the reset transistor 621 and the floating diffusion layer 624 of the pixel signal generation unit 62 may be disposed on the light receiving chip 101, and the other elements may be disposed on the detection chip 102. Furthermore, some of the elements constituting the event detection section 63 may be disposed on the light receiving chip 101 together with each element of the light receiving unit 61 and the like.

<Configuration Example of Imaging Device>

A basic configuration of imaging device 20 in the imaging system 1 of the present disclosure will be described. Here, as the imaging device 20, a CMOS image sensor which is a type of X-Y address imaging device will be described as an example. The CMOS image sensor is an image sensor manufactured by applying or partially using a CMOS process. However, the imaging device 20 is not limited to the CMOS image sensor.

[Configuration Example of CMOS Image Sensor]

Figure 9:
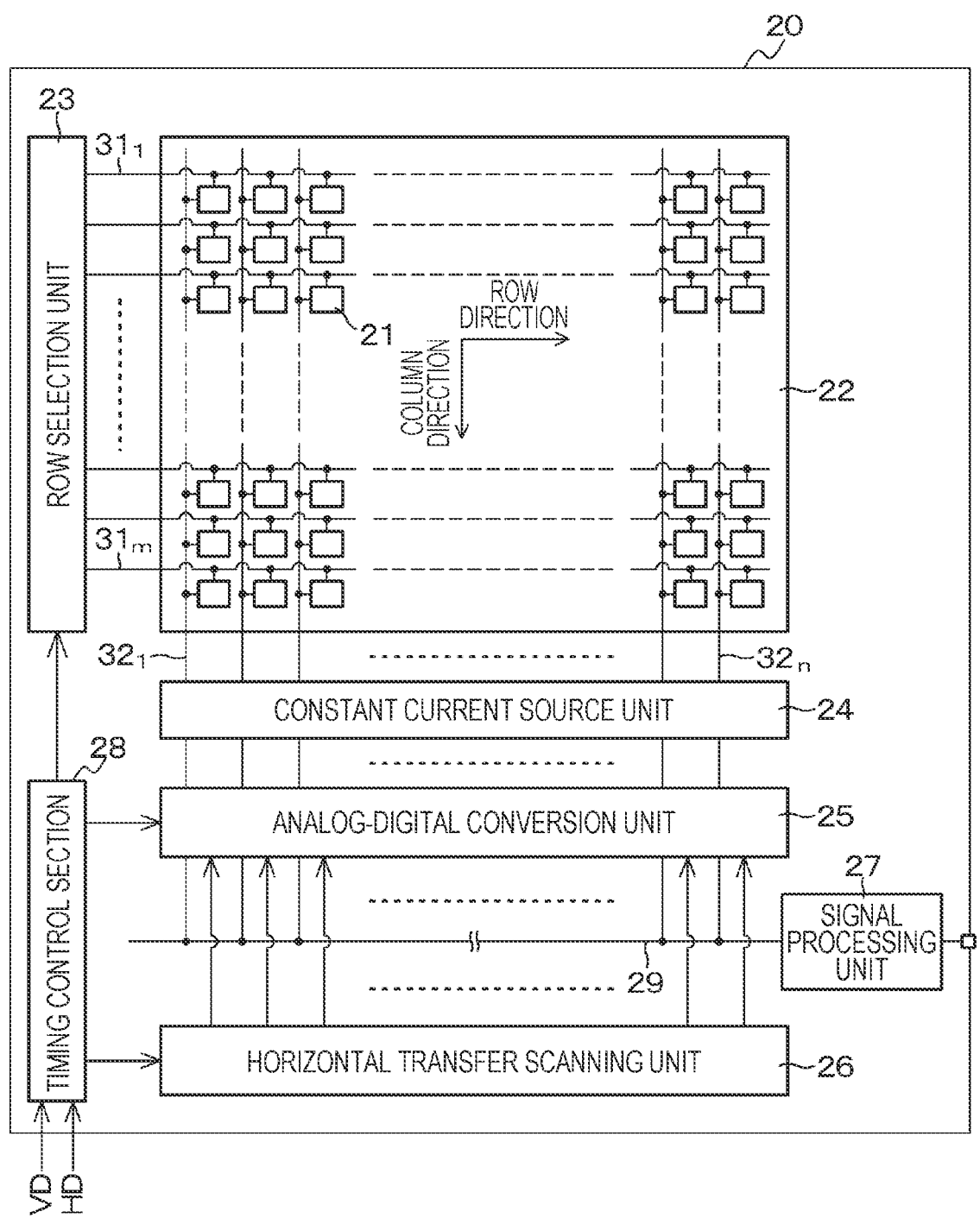
FIG. 9 is a block diagram schematically illustrating a configuration of a CMOS image sensor which is an example of an imaging device in the imaging system of the present disclosure.

FIG. 9 is a block diagram schematically illustrating a configuration of the CMOS image sensor which is an example of the imaging device 20 in the imaging system 1 of the present disclosure.

The imaging device 20 according to the present example includes a pixel array unit 22 in which pixels 21 including a light receiving unit (photoelectric conversion unit) are two-dimensionally arranged in a row direction and a column direction, that is, in a matrix, and a peripheral circuit unit of the pixel array unit 22. Here, the row direction refers to an arrangement direction of the pixels 21 in the pixel row, and the column direction refers to an arrangement direction of the pixels 21 in the pixel column. The pixel 21 performs photoelectric conversion to generate and accumulate a photo-charge corresponding to the amount of received light.

The imaging device 20 according to the present example is an RGB sensor in which, for example, R (red), G (green), and B (blue) color filters are incorporated in each pixel 21 of the pixel array unit 22. However, the imaging device 20 is not limited to the RGB sensor.

The peripheral circuit unit of the pixel array unit 22 includes, for example, a row selector 23, a constant current source unit 24, an analog-digital conversion unit 25, a horizontal transfer scanning unit 26, a signal processing unit 27, a timing control section 28, and the like.

In the pixel array unit 22, pixel drive lines $31_1$ to $31_m$ (hereinafter, the pixel drive lines 31 may be collectively referred to as "pixel drive lines") are wired along the row direction for each pixel row with respect to the matrix-like pixel array. Furthermore, vertical signal lines $32_1$ to $32_n$ (hereinafter, the vertical signal lines 32 may be collectively referred to as "vertical signal lines") are wired along the column direction for each pixel column. The pixel drive line 31 transmits a drive signal for driving when reading a signal from the pixel 21. In FIG. 1, the pixel drive line 31 is illustrated as one wiring, but is not limited to one. One end of the pixel drive line 31 is connected to an output terminal corresponding to each row of the row selector 23.

Hereinafter, each circuit unit of the peripheral circuit unit of the pixel array unit 22, that is, the row selector 23, the constant current source unit 21, the analog-digital conversion unit 25, the horizontal transfer scanning unit 26, the signal processing unit 27, and the timing control section 28 will be described.

The row selector 23 includes a shift register, an address decoder, and the like, and controls scanning of the pixel row and an address of the pixel row when selecting each pixel 21 of the pixel array unit 22. Although a specific configuration of the row selector 23 is not illustrated, the row selector generally includes two scanning systems of a reading scanning system and a sweeping scanning system.

In order to read a pixel signal from the pixel 21, the reading scanning system sequentially selects and scans each pixel 21 of the pixel array unit 22 row by row. The pixel signal read from the pixel 21 is an analog signal. The sweep scanning system performs sweep scanning on a read row on which read scanning is performed by the reading scanning system prior to the read scanning by a time corresponding to a shutter speed.

By the sweep scanning by the sweep scanning system, unnecessary charges are swept out from the light receiving unit (photoelectric conversion unit) of the pixel 21 in the read row, and thus, the light receiving unit is reset. Then, by sweeping out (resetting) unnecessary charges by the sweeping scanning system, a so-called electronic shutter operation is performed. Here, the electronic shutter operation refers to an operation of discarding a photo-charge of the light receiving unit and newly starting exposure (starting accumulation of photo-charge).

The constant current source unit 24 includes a plurality of current sources I (refer to FIG. 10) each including, for example, a MOS transistor and connected to each of the vertical signal lines $32_1$ to $32_n$ for each pixel column, and supplies a bias current to each pixel 21 of the pixel row selectively scanned by the row selector 23 through each of the vertical signal lines $32_1$ to $32_n$.

The analog-digital conversion unit 25 includes a set of a plurality of analog-digital converters (for example, each pixel column is provided) provided corresponding to the pixel columns of the pixel array unit 22. The analog-digital conversion unit 25 is a column-parallel analog-digital conversion unit that converts an analog pixel signal output through each of the vertical signal lines $32_1$ to $32_n$ for each pixel column into a digital signal.

As the analog-digital converter in the column-parallel analog-digital conversion unit 25, for example, a single-slope analog-digital converter that is an example of a reference signal comparison analog-digital converter can be used. However, the analog-digital converter is not limited to the single slope type analog-digital converter, and a successive approximation type analog-digital converter, a delta-sigma modulation type (ΔΣ modulation type) analog-digital converter, and the like can be used.

The analog-digital converter in the column-parallel analog-digital conversion unit 25 is similarly applied to the analog-digital converter in the analog-digital conversion unit constituting the column processing unit 15 (refer to FIG. 2) of the event detection device 10 described above.

The horizontal transfer scanning unit 26 includes a shift register, an address decoder, and the like, and controls scanning of a pixel column and an address of the pixel column when reading a signal of each pixel 21 of the pixel array unit 22. Under the control of the horizontal transfer scanning unit 26, the pixel signal converted into the digital signal by the analog-digital conversion unit 25 is read out to the horizontal transfer line (horizontal output line) 29 in units of pixel columns.

The signal processing unit 27 performs predetermined signal processing on the digital pixel signal supplied through the horizontal transfer line 29 to generate two-dimensional image data. For example, the signal processing unit 27 corrects a vertical line defect or a point defect, clamps a signal or performs digital signal processing such as parallel-to-serial conversion, compression, encoding, addition, averaging, and intermittent operation. The signal processing unit 27 outputs the generated image data to a subsequent device as an output signal of the imaging device 20.

The timing control section 28 generates various timing signals, clock signals, control signals, and the like based on a vertical synchronization signal VD and a horizontal synchronization signal HD supplied from the outside, a master clock MCK (not illustrated), and the like. Then, the timing control section 28 performs drive control of the row selector 23, the constant current source unit 24, the analog-digital conversion unit 25, the horizontal transfer scanning unit 26, the signal processing unit 27, and the like based on the generated signals.

Under the control of the timing control section 28, the imaging device 20 performs imaging in synchronization with a synchronization signal such as the vertical synchronization signal VD. That is, the present imaging device 20 is a synchronous imaging device that captures an image at a fixed frame rate.

[Exemplary Circuit Configuration of Pixel]

Figure 10:
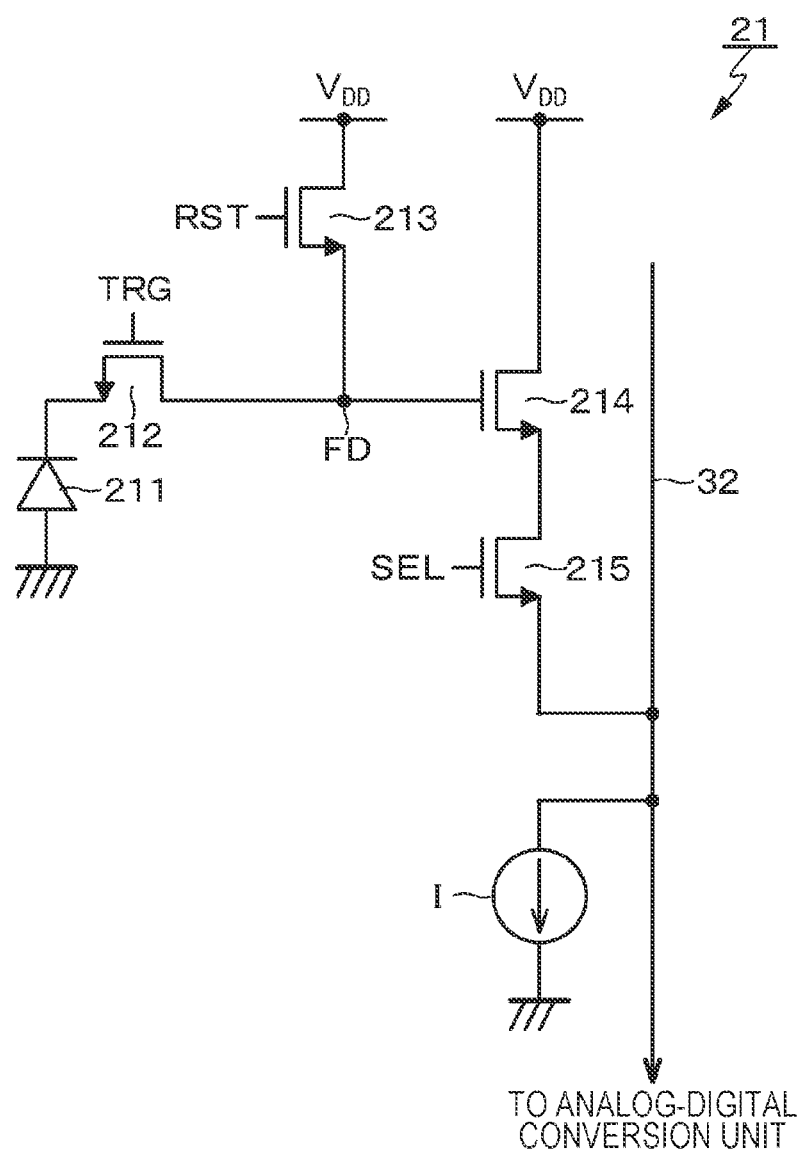
FIG. 10 is a circuit diagram 10 illustrating an example of a circuit configuration of a pixel in the imaging device.

FIG. 10 is a circuit diagram illustrating an example of a circuit configuration of the pixel 21 of the pixel array unit 22 in the imaging device 20.

The pixel 21 includes, for example, a photodiode 211 as a light receiving unit (photoelectric conversion unit). The pixel 21 has a pixel configuration including a transfer transistor 212, a reset transistor 213, an amplification transistor 214, and a selection transistor 215 in addition to the photodiode 211.

Note that, here, for example, an N-type MOS transistor as used as the four transistors of the transfer transistor 212, the reset transistor 213, the amplification transistor 214, and the selection transistor 215, but the combination of the conductivity types of the four transistors 212 to 215 exemplified here is merely an example, and the combination is not limited to these.

For the pixel 21, as the pixel drive line 31 described above, a plurality of pixel drive lines is wired in common to each pixel 21 of the same pixel row. The plurality of pixel drive lines is connected to output terminals of the row selector 23 corresponding to the respective pixel rows in units of pixel rows. The row selector 23 appropriately outputs the transfer signal TRG, the reset signal RST, and the selection signal SEL to the plurality of pixel drive lines.

The photodiode 211 has an anode electrode connected to a low-potential-side power supply (for example, ground), photoelectrically converts received light into photo-charge (here, photoelectrons) of a charge amount corresponding to the amount of light, and accumulates the photo-charge. A cathode electrode of the photodiode 211 is electrically connected to a gate electrode of the amplification transistor 214 via the transfer transistor 212. Here, a region where the gate electrode of the amplification transistor 214 is electrically connected is a floating diffusion (floating diffusion region/impurity diffusion region) FD. The floating diffusion FD is a charge-voltage conversion unit that converts a charge into a voltage.

A transfer signal TRG that activates a high level (for example, $V_{DD}$ level) is supplied from the row selector 23 to a gate electrode of the transfer transistor 212. The transfer transistor 212 is turned on in response to the transfer signal TRG, and thus, transfers the photo-charge photoelectrically converted by the photodiode 211 and accumulated in the photodiode 211 to the floating diffusion FD.

The reset transistor 213 is connected between the power supply line of the power supply voltage $V_{DD}$ and the floating diffusion FD. To a gate electrode of the reset transistor 213, a reset signal RST that activates a high level is provided from the row selector 23. The reset transistor 213 is turned on in response to the reset signal RST, and resets the floating diffusion FD by discarding the charge of the floating diffusion FD to the node of the power supply voltage $V_{DD}$.

In the amplification transistor 214, a gate electrode is connected to the floating diffusion FD, and a drain electrode is connected to a power supply line of the power supply voltage $V_{DD}$. The amplification transistor 214 serves as an input unit of a source follower that reads a signal obtained by photoelectric conversion in the photodiode 211. A source electrode of the amplification transistor 214 is connected to the vertical signal line 32 via the selection transistor 215. Then, the amplification transistor 214 and the current source I connected to one end of the vertical signal line 32 constitute a source follower that converts the voltage of the floating diffusion FD into the potential of the vertical signal line 32.

In the selection transistor 215, a drain electrode is connected to a source electrode of the amplification transistor 214, and a source electrode is connected to the vertical signal line 32. A selection signal SEL in which a high level is active is provided from the row selector 23 to a gate electrode of the selection transistor 215. The selection transistor 215 is turned on in response to the selection signal SEL, and thus, transmits the signal output from the amplification transistor 214 to the vertical signal line 32 with the pixel 21 in a selected state.

Note that, here, a 4 Tr configuration including the transfer transistor 212, the reset transistor 213, the amplification transistor 214, and the selection transistor 215, that is, including four transistors (Tr) has been described as an example of the pixel circuit of the pixel 21, but the present invention is not limited thereto. For example, a 3 Tr configuration may be adopt in which the selection transistor 215 is omitted and the amplification transistor 214 has the function of the selection transistor 25, or a configuration of 5 Tr or more may be adopted in which the number of transistors is increased as necessary.

[Configuration Example of Chip Structure]

As a chip (semiconductor integrated circuit) structure of the imaging device 20 having the above configuration, a flat chip structure and a laminated chip structure can be exemplified. In any of the imaging device 20 having the flat chip structure and the laminated chip structure, when the substrate surface on the side on which the wiring layer is disposed is a front surface (front surface), the pixel 21 can have a front surface irradiation type pixel structure that captures light irradiated from the front surface side, or can have a back surface irradiation type pixel structure that captures light irradiated from the back surface side on the opposite side. Hereinafter, a flat chip structure and a laminated chip structure will be described.

(Flat Chip Structure)

Figure 11:
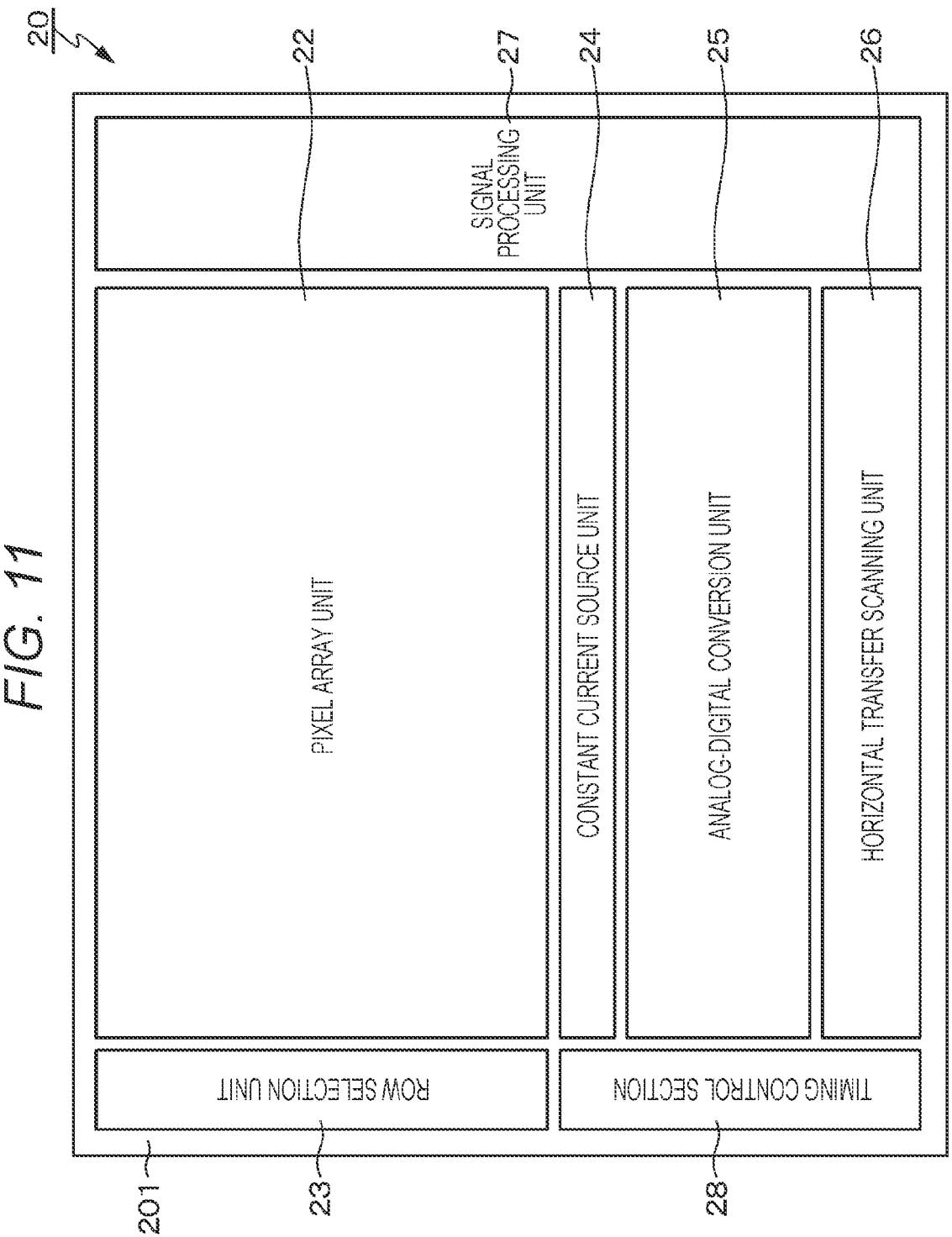
FIG. 11 is a plan view schematically illustrating a flat chip structure of the imaging device.

FIG. 11 is a plan view schematically illustrating a flat chip structure of the imaging device 20.

As illustrated in FIG. 11, the flat chip structure (so-called flat structure) has a structure in which a circuit portion around the pixel array unit 22 is formed on the same semiconductor substrate 201 as the pixel array unit 22 in which the pixels 21 are arranged in a matrix. Specifically, the row selector 23, the constant current source unit 24, the analog-digital conversion unit 25, the horizontal transfer scanning unit 26, the signal processing unit 27, the timing control section 28, and the like are formed on the same semiconductor substrate 201 as the pixel array unit 22.

(Laminated Chip Structure)

Figure 12A:
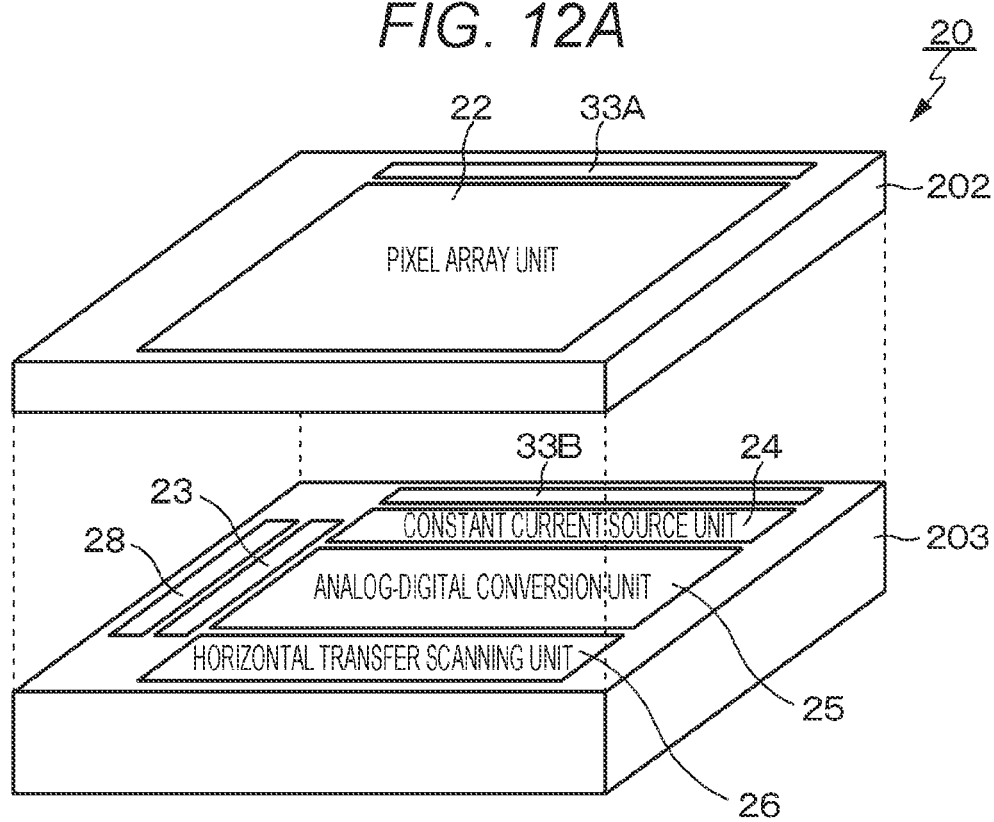
FIG. 12A is a plan view schematically illustrating the laminated chip structure of the imaging device.

FIG. 12A is an exploded perspective view schematically illustrating a laminated chip structure of the imaging device 20.

As illustrated in FIG. 12A, the laminated chip structure (so-called laminated structure) has a structure in which at least two semiconductor substrates of a first semiconductor substrate 202 or a second semiconductor substrate 203 are laminated. In this laminated structure, the pixel array unit 22 is formed on the first semiconductor substrate 202 of the first layer. Furthermore, circuit portions such as the row selector 23, the constant current source unit 24, the analog-digital conversion unit 25, the horizontal transfer scanning unit 26, the signal processing unit 27, and the timing control section 28 are formed on the second semiconductor substrate 203 of the second layer. Then, the first semiconductor substrate 202 of the first layer and the second semiconductor substrate 203 of the second layer are electrically connected through connection portions 33A and 33B such as vias (VIA) and Cu—Cu bonding.

According to the imaging device 20 having the laminated structure, a process suitable for manufacturing the pixel 21 can be applied to the first semiconductor substrate 202 of the first layer, and a process suitable for manufacturing the circuit portion can be applied to the second semiconductor substrate 203 of the second layer. Therefore, the process can be optimized in manufacturing the imaging device 20. In particular, an advanced process can be applied to manufacture the circuit portion.

Note that, here, the laminated structure of the two-layer structure formed by laminating the first semiconductor substrate 202 and the second semiconductor substrate 203 has been exemplified, but the laminated structure is not limited to the two-layer structure, and may be a structure of three or more layers. Then, in the case of a laminated structure of three or more layers, circuit portions such as the row selector 23, the constant current source unit 24, the analog-digital conversion unit 25, the horizontal transfer scanning unit 26, and the signal processing unit 27 can be formed in a distributed manner on the semiconductor substrates of the second and subsequent layers.

The imaging system 1 of the present disclosure including the event detection device 10 including the asynchronous imaging device and the imaging device 20 including the synchronous imaging device described above can be used by being mounted on a moving body such as a vehicle. When the imaging system 1 is mounted on a vehicle and used, for example, the imaging system 1 is disposed and used at a predetermined position of the vehicle, for example, at least one of a front nose, a side mirror, a rear bumper, or a back door of the vehicle, or an upper portion of a windshield in a vehicle interior. Details of application examples of the technology (that is, the imaging system 1 of the present disclosure) according to the present disclosure will be described later.

In the imaging system 1 of the present disclosure, the control section 30 controls the event detection device 10 including an asynchronous imaging device and the imaging device 20 including a synchronous imaging device. Specifically, when the vehicle travels, first, the event detection device 10 detects an event under the control of the control section 30.

In the above description of the event detection device 10, the event detection section 63 illustrated in FIG. 3 detects that the light amount change (luminance change) exceeds the predetermined threshold for each pixel 11 as an event, but the detection of the event is not limited to the detection for each pixel 11 by the event detection section 63. Specifically, as illustrated in FIGS. 3 and 4, the event detection device 10 can include the pixel signal generation unit 62 for each pixel 11 to acquire an image. Then, the state of the road surface, specifically, a damaged portion (for example, holes, large grooves, cracks, irregularities, recesses, and the like), a falling object, or the like can be detected as an event based on the image captured and acquired by the event detection device 10.

In the event detection device 10, for example, since a pixel configuration including the light receiving unit 61, the pixel signal generation unit 62, and the event detection section 63 is adopted for each pixel 11, the pixel size has to be larger than that of the synchronous imaging device 20, and the resolution is low. Therefore, in the case of the event detection device 10, even when, for example, a damaged portion of a road surface, a falling object, or the like can be detected as an event based on an image captured and acquired, the object recognition of the event cannot be accurately performed because the resolution is lower than that of the synchronous imaging device 20.

Figure 12B:
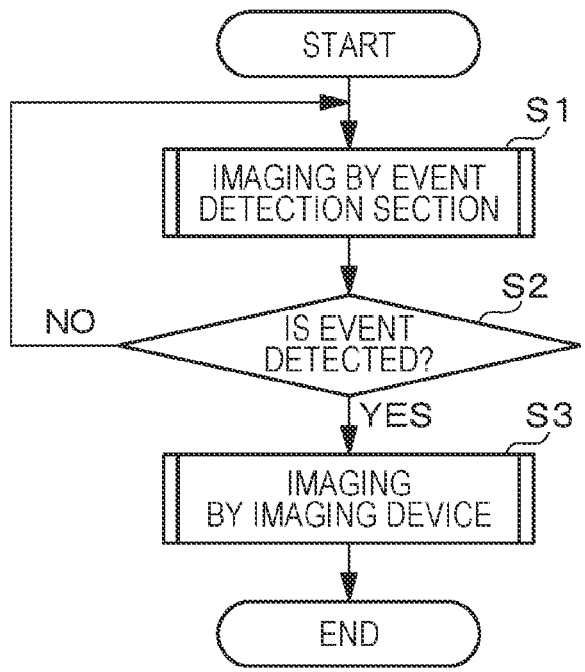
FIG. 12B is a flowchart illustrating an example of processing of a method of controlling the imaging system of the present disclosure.

Therefore, in response to the event detection device 10 detecting an event, the control section 30 performs control so that the image information of the region including the event is acquired by the imaging device 20. An example of processing of a method of controlling the imaging system 1 of the present disclosure is illustrated in a flowchart of FIG. 12B. The control section 30 performs imaging by the event detection device 10 (Step S1), and then, determines whether or not the event detection device 10 has detected an event (Step S2). A specific example of the processing in Step S1 will be described later. Next, when determining that the event detection device 10 has detected an event (YES in S2), the control section 30 switches from imaging by the event detection device 10 to imaging by the imaging device 20 (Step S3). A specific example of the processing in Step S3 will be described later. The imaging device 20 including a synchronous imaging device is excellent in resolution as compared with the event detection device 10 including an asynchronous imaging device. Therefore, according to the imaging system 1 of the present disclosure, after the event detection device 10 detects the event, the imaging device 20 can acquire the image information of the region including the event with a resolution higher than that of the event detection device 10. As a result, the object recognition of the event can be performed more accurately based on the image information of the region including the event captured and acquired by the imaging device 20.

<<Object Recognition System of Present Disclosure>>

Next, an object recognition system of the present disclosure that performs object recognition using the imaging system 1 of the present disclosure having the above-described configuration will be described. The object recognition system of the present disclosure can be mounted on a moving body such as a vehicle and used for object recognition of an event, similarly to the imaging system 1 of the present disclosure.

<Configuration Example of Object Recognition System>

FIG. 13 is a block diagram illustrating an example of a system configuration of the object recognition system of the present disclosure using the imaging system 1 of the present disclosure.

As illustrated in FIG. 13, the object recognition system 2 of the present disclosure includes a recognition processing unit 60 in addition to the event detection device 10, the imaging device 20, the control section 30, the data processing unit 40, and the image recording unit 50 in the imaging system 1 of the present disclosure illustrated in FIG. 1.

Details of the event detection device 10, the imaging device 20, the control section 30, the data processing unit 40, and the image recording unit 50 are as described above.

In the object recognition system 2 having the above configuration, under the control of the control section 30, the event data and the image data are output from the event detection device 10 and supplied to the data processing unit 40, and the image data of the region including the event is output from the imaging device 20 and supplied to the data processing unit 40.

The event data and the image data processed by the data processing unit 40 are supplied to the recognition processing unit 60. When knowing that the event detection device 10 has detected an event via the data processing unit 40, the control section 30 controls the imaging device 20 to capture an image of a region including the event detected by the event detection device 10.

The recognition processing unit 60 performs object recognition processing for an event based on the event data and the image data supplied from the data processing unit 40. For the object recognition in the recognition processing unit 60, a known pattern recognition technology, for example, a technology of performing image recognition by comparing a feature point of an image given as teacher data with a feature point of an imaged subject image can be used.

Hereinafter, an embodiment of specific processing of object recognition based on event detection executed in the object recognition system 2 having the above configuration will be described. The object recognition processing described below is basically executed under the control of the control section 30 of the imaging system 1.

EXAMPLE 1

Example 1 is an example of basic processing of object recognition based on event detection. An example of a flow of the object recognition processing according to Example 1 is illustrated in a flowchart of FIG. 14.

In the processing described below, detection of an event is performed based on an image captured and acquired by the event detection device 10. This similarly applies to Example 2 and Example 3 described later.

First, the control section 30 performs imaging (hereinafter, it is described as "DVS imaging") by the event detection device 10 (Step S11), and then, determines whether or not the event detection device 10 has detected an event (Step S12). A specific example of the processing (DVS imaging) in Step S11 will be described later.

Next, when determining that the event detection device 10 has detected an event (YES in S12), the control section 30 switches from the DVS imaging (imaging by the event detection device 10) to the imaging by the imaging device 20 (Step S13). A specific example of the processing of Step S13 will be described later. In a case where the event detection device 10 does not detect an event (NO in S12), the control section 30 returns to Step S11 and continuously executes the DVS imaging until the event detection device 10 detects an event.

Next, the control section 30 acquires image data captured by the imaging device 20 (Step S14), and executes object recognition processing for an event based on the acquired image data (Step S15). As described above, the series of processing for the object recognition of the event based on the detection of the event is ended.

EXAMPLE 2

Figure 15:
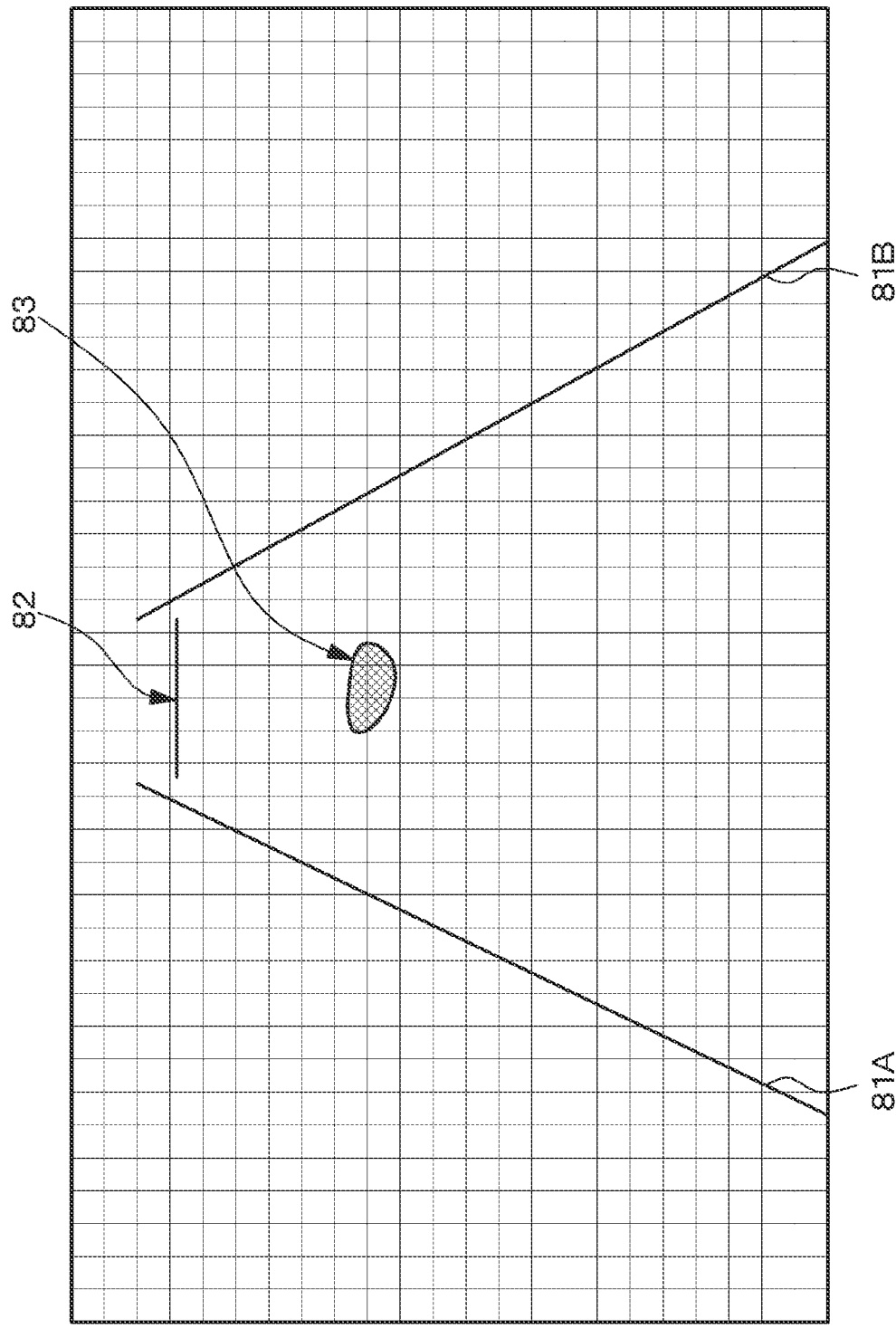
FIG. 15 is a schematic view illustrating a texture such as a white line, a destination display, and an arrow drawn on a road, and a damaged portion such as a hole, a large groove, a crack, unevenness, and a depression existing on a road surface.

Example 2 is a specific example of the DVS imaging (imaging by the event detection device 10), and is an example of detecting a damaged portion of a road as an event. As illustrated in FIG. 15, a texture such as a white line 82, a destination display, and an arrow is drawn on the road defined by the road edges 81A and 81B, and there may be a hole 83, and a damaged portion such as a large groove, a crack, irregularities, and a depression. Since there is a case where the hole 83 or a damaged portion such as a crack, unevenness, or depression becomes an obstacle for the running vehicle, it is preferable that the damaged portion can be detected as an event in advance.

Figure 16:
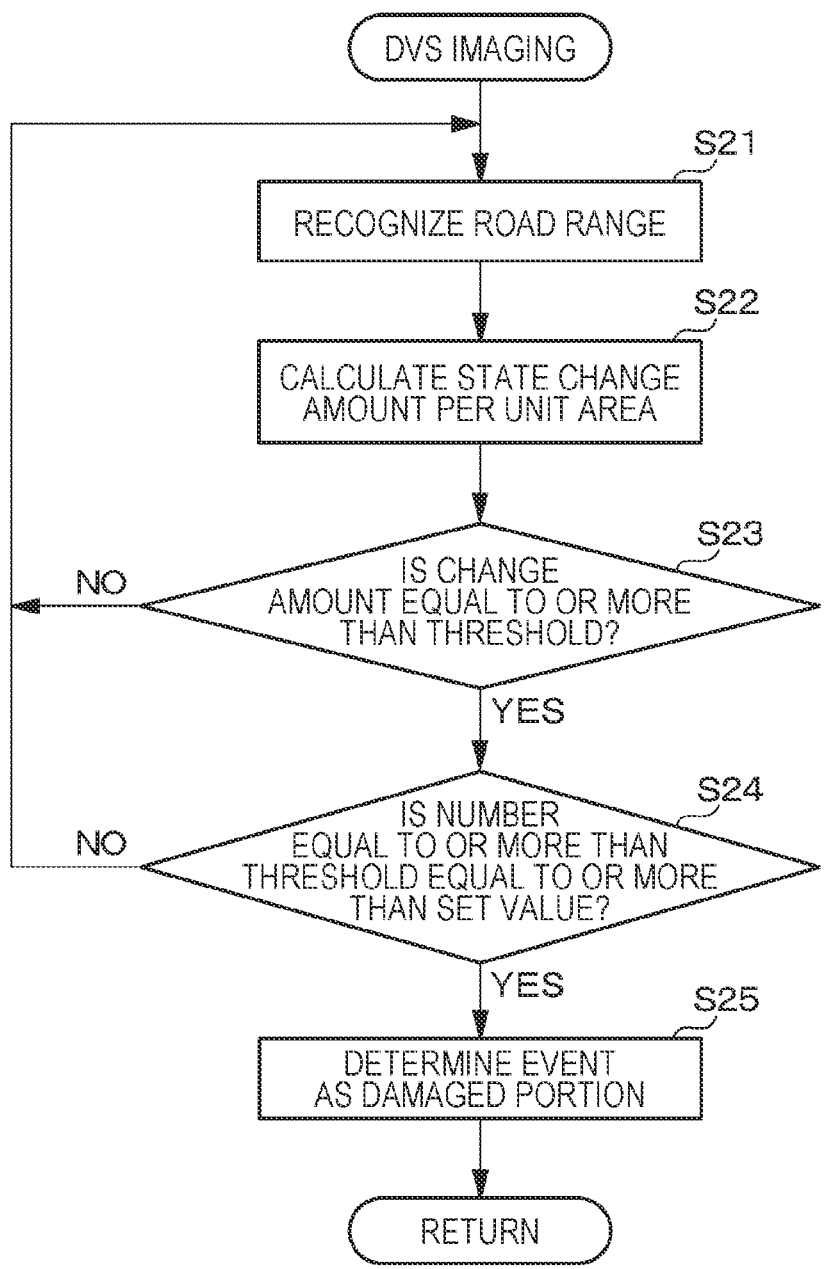
FIG. 16 is a flowchart illustrating a flow of processing of DVS imaging according to Example 2.

Example 2 is an example in which a damaged portion such as the hole 83 is identified from a texture of the white line 82 or the like drawn on the road, and the damaged portion of the road is detected as an event. An example of a flow of processing of the DVS imaging according to Example 2 is illustrated in a flowchart of FIG. 16. The processing of the DVS imaging is processing executed in the data processing unit 40 under the control of the control section 30 in FIG. 13. Furthermore, it is assumed that the event detection device 10 can acquire an image although the resolution is lower than that of the imaging device 20.

The control section 30 recognizes the road range from the image (for example, a binary image) in front of the vehicle acquired by the event detection device 10 (Step S21). The road range can be recognized by detecting a center point in a traveling direction of the vehicle and the road edges 81A and 81B.

Next, in the recognized road range, the control section 30 divides the image (for example, a binary image) acquired by the event detection device 10 into regions in a mesh shape (block division), and obtains the state change amount per unit area from the image obtained by the region division by calculation (Step S22). In a case where the state change amount per unit area is large, it can be determined that roughness of the road surface is large, that is, there is a damaged portion such as the hole 83, a large groove, a crack, unevenness, or a depression.

Next, in order to determine the state of the road surface, the control section 30 determines whether or not the state change amount per unit area is equal to or more than a predetermined threshold in units of mesh-divided regions (Step S23). In the determination processing in Step S23, when there is no region where the state change amount per unit area is equal to or more than the predetermined threshold (NO in S23), the control section 30 returns to Step S21.

When there is a region where the state change amount per unit area is equal to or more than the predetermined threshold (YES in S23), the control section 30 determines whether or not the number of regions equal to or more than the threshold is equal to or more than a predetermined set value (Step S24). In a case where the number of the state change amounts equal to or more than the threshold is equal to or more than the set value in the adjacent divided regions, it is possible to detect the presence of the hole 83 or a damaged portion such as a large groove, a crack, unevenness, or a depression.

In the determination processing of Step S24, when the number of regions equal to or more than the threshold is less than the predetermined set value (NO of S24), the control section 30 returns to Step S21, and when the number is equal to or more than the predetermined set value (YES of S24), the event detected by the event detection device 10 is determined as the damaged portion of the road surface such as the hole 83 (Step S25).

As described above, the series of processes for detecting the damaged portion of the road based on the DVS imaging (imaging by the event detection device 10) is ended, the flow returns to the flow of FIG. 13, and the process proceeds to Step S12.

Here, it is assumed that the object recognition system 2 of the present disclosure is applied to a vehicle control system 7000 (refer to FIG. 25) to be described later, and is used for automatic driving and an advanced driver assistance system (ADAS). In this case, the control section 30 notifies the vehicle control system 7000 via the communication unit (not illustrated) that the event detected by the event detection device 10 is a damaged portion of the road surface. Upon receiving this notification, a microcomputer 7610 of the vehicle control system 7000 can perform control such as reducing a traveling speed or avoiding a damaged portion.

Furthermore, the damaged portion of the road surface detected as an event by the event detection device 10 can also be used, for example, to detect a rough portion of the road surface for road maintenance after a clear image of the damaged portion is captured by the imaging device 30 and the image data is recorded in the image recording unit 50. Therefore, even when a roadway corporation does not monitor the road surface condition of the road, it is possible to obtain highly accurate real-time data by statistically processing the information from the traveling vehicle, that is, the information of the damaged portion of the road surface detected as the event by the event detection device 10. Moreover, it is also possible to provide information such as the damaged portion of the road surface and a falling of a dangerous article to the driver of the following vehicle based on highly accurate real-time data.

After the event detection device 10 detects the damaged portion of the road surface as an event, the control section 30 excludes the texture such as the white line 82, the destination display, and the arrow drawn on the road from a target to be recognized by the event detection device 10 and sets the texture to the target to be recognized by the imaging device 20.

Note that, in the processing of the DVS imaging according to Example 2, the damaged portion of the road surface and the texture drawn on the road are identified each time the processing is performed, but the feature of the texture drawn on the road may be learned to distinguish the damaged portion from the road surface.

Furthermore, in the processing of the DVS imaging according to Example 2, the image acquired by the event detection device 10 has been described as a binary image, but a monochrome image (for example, 256 gradations) may be used. In the case of the monochrome image, finer setting than in the case of the binary image, for example, setting such as luminance of 50 or more and 100 or less is possible.

In the case of the binary image, white or black is displayed, and the white region is a region when a state change of a certain threshold or more is detected. Therefore, after the road range is recognized in the processing of Step S21, the white region of the binary image is detected, and it can be determined that the road surface is damaged, such as the hole 83, based on whether or not the change in the white region is equal to or more than the threshold.

EXAMPLE 3

Example 3 is a specific example of DVS imaging (imaging by the event detection device 10), and is an example in which a threshold for event detection, for example, a threshold (threshold of processing in Step S23 in FIG. 16) for determining the state of the road surface is dynamically changed according to the situation outside the vehicle. Here, examples of the situation outside the vehicle include brightness, weather, a state of a road surface such as a wet road surface, and the like.

Figure 17:
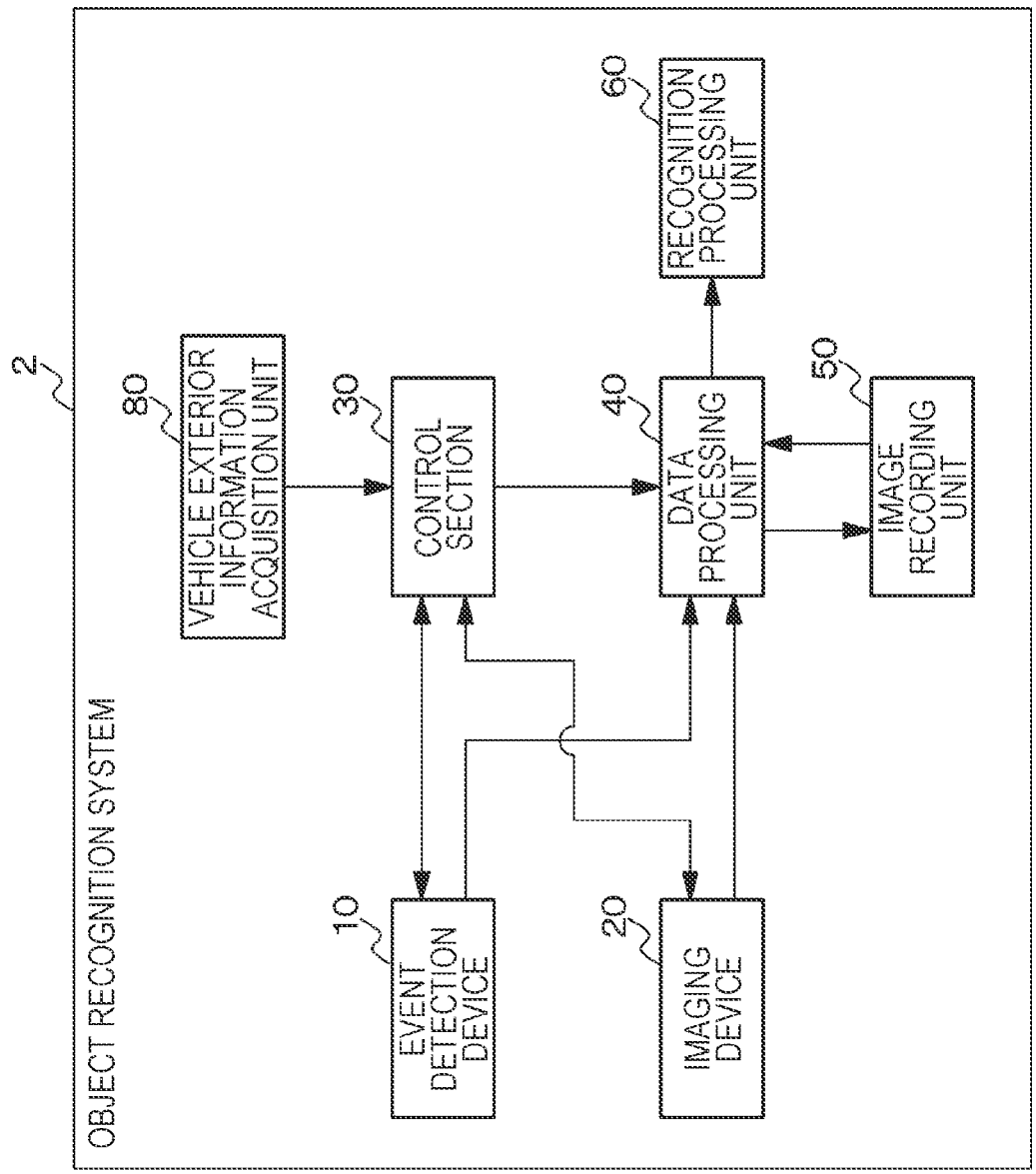
FIG. 17 is a block diagram illustrating an example of a system configuration of an object recognition system to which DVS imaging according to Example 3 is applied.

FIG. 17 is a block diagram illustrating an example of a system configuration of an object recognition system to which the DVS imaging according to Example 3 is applied. The object recognition system to which the DVS imaging according to Example 3 is applied is mounted on and used in a moving body such as an automobile.

The object recognition system 2 according to Example 3 includes a vehicle exterior information acquisition unit 80 in addition to the event detection device 10, the imaging device 20, the control section 30, the data processing unit 40, the image recording unit 50, and the recognition processing unit 60 in FIG. 13. The vehicle exterior information acquisition unit 80 acquires vehicle exterior information indicating the situation outside the vehicle.

The vehicle exterior information acquisition unit 80 includes, for example, an environment sensor for detecting current weather or climate. The environment sensor may be, for example, at least one of a raindrop sensor that detects rainy weather, a fog sensor that detects fog, a sunlight sensor that detects a degree of sunshine, or a snow sensor that detects snowfall. The vehicle exterior information acquisition unit 80 is provided at, for example, at least one of a front nose, a side mirror, a rear bumper, or a back door of the vehicle, or an upper portion of a windshield in a vehicle interior.

The vehicle exterior information acquired by the vehicle exterior information acquisition unit 80 is given to the control section 30. The control section 30 performs control to dynamically change the threshold for event detection based on the vehicle exterior information given from the vehicle exterior information acquisition unit 80. The threshold for the event detection is, for example, the threshold in the processing of Step S23 in FIG. 16, that is, the threshold for determining the state of the road surface. The control section 30 performs control to dynamically change the threshold for determining the state of the road surface based on the vehicle exterior information given from the vehicle exterior information acquisition unit 80.

Figure 18:
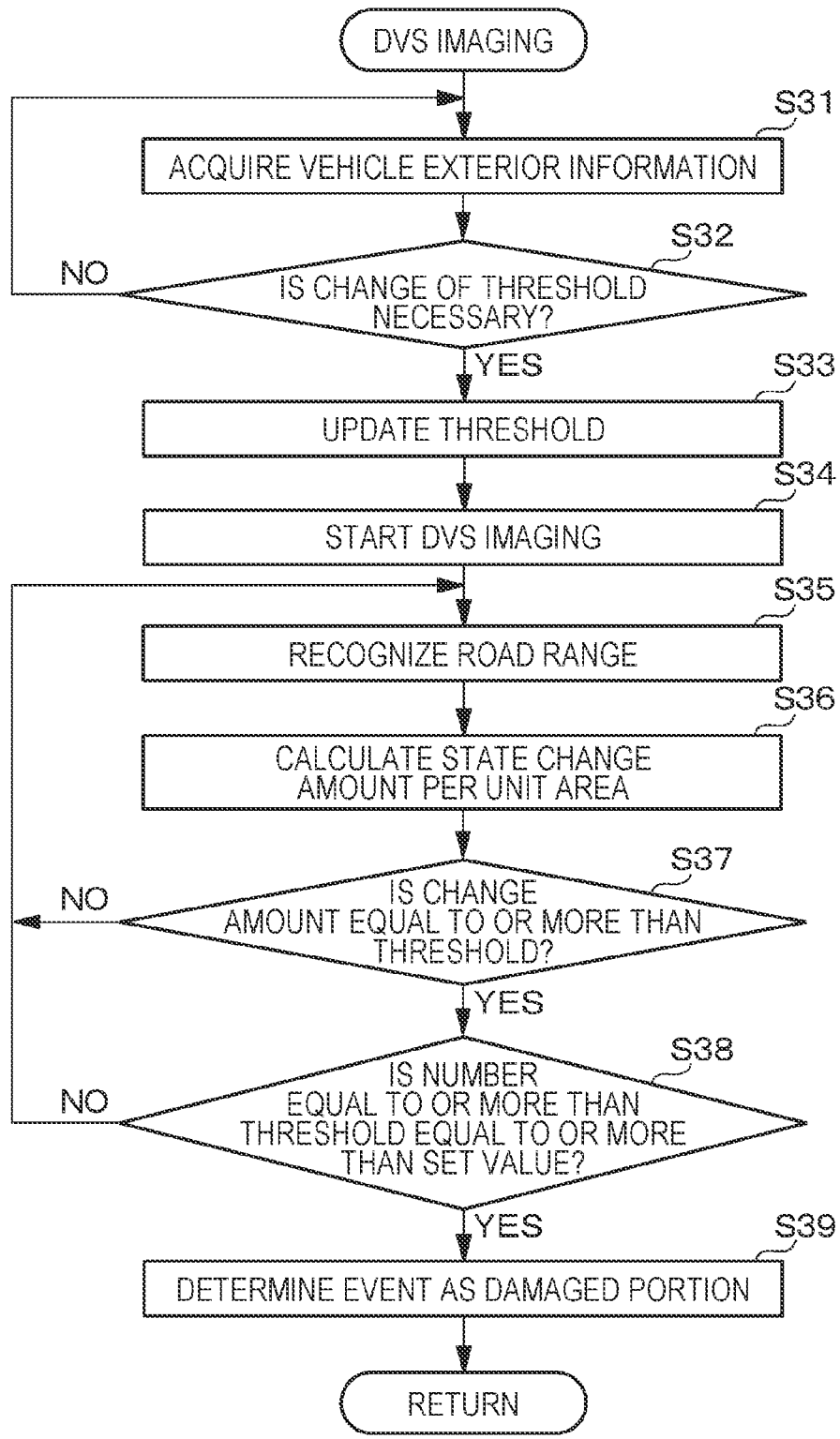
FIG. 18 is a flowchart illustrating a flow of processing of DVS imaging according to Example 3.

An example of a flow of the processing of the DVS imaging according to Example 3 is illustrated in a flowchart of FIG. 18. The processing of the DVS imaging is processing executed in the data processing unit 40 under the control of the control section 30 in FIG. 13.

The control section 30 acquires the vehicle exterior information from the vehicle exterior information acquisition unit 80 (Step S31), and then determines whether or not it is necessary to change a threshold for detecting an event based on the acquired vehicle exterior information (Step S32). Then, if it is necessary to change the threshold (YES in S32), the control section 30 updates the threshold for detecting an event (Step S33), and then starts the DVS imaging (Step S34).

Next, the control section 30 recognizes a road range from the image (for example, a binary image) in front of the vehicle acquired by the event detection device 10 (Step S35), then divides the image acquired by the event detection device 10 into regions in a mesh shape in the recognized road range, and obtains the state change amount per unit area from the divided region image by calculation (Step S36).

Next, in order to determine the state of the road surface, the control section 30 determines whether or not the state change amount per unit area is equal to or more than a predetermined threshold in units of mesh-divided regions (Step S37). Then, when there is no region where the state change amount per unit area is equal to or more than the predetermined threshold (NO in S37), the process returns to Step S35, and when there is a region (YES in S37), the control section 30 determines whether or not the number of regions equal to or more than the threshold is equal to or more than a predetermined set value (Step S38).

In the determination processing of Step S38, when the number of regions equal to or more than the threshold is less than the predetermined set value (NO of S38), the control section 30 returns to Step S35, and when the number is equal to or more than the predetermined set value (YES of S38), the event detected by the event detection device 10 is determined as the damaged portion of the road surface such as the hole 83 (Step S39). Then, the control section 30 notifies the recognition processing unit 60 that the event detected by the event detection device 10 is a damaged portion of the road surface (Step S40). The subsequent processing is similar as that of the second embodiment.

EXAMPLE 4

Example 4 is a specific example of imaging by the imaging device 20 in Step S13 in FIG. 4, and is an example of recognizing (monitoring) the surroundings of the host vehicle by the imaging device 20 during normal traveling. The imaging device 20 has a resolution superior to that of the event detection device 10 and is suitable for an application of recording an image. On the other hand, although the resolution of the event detection device 10 is lower than that of the imaging device 20, the event detection device can capture an image of a high-speed moving object without distortion.

Furthermore, in the CMOS image sensor used as the imaging device 20, in the case of the rolling shutter method, since the pixel signal is read for each row, time is shifted in reading of the next row, and in principle, moving body distortion called focal plane distortion occurs when one pixel is formed. By increasing the frame rate, it is possible to reduce the focal plane distortion, but as an adverse effect thereof, the exposure time is shortened, and sufficient luminance as a recognition image cannot be obtained.

The global shutter system can be one solution to the problem of focal plane distortion, but since a dedicated capacitive element for temporarily storing photoelectrically converted charges is required, the chip area increases, which is disadvantageous in terms of cost.

On the other hand, in the case of the event detection device 10 including an asynchronous imaging device, since there is basically no concept of a frame, the focal plane distortion does not occur.

Figure 19:
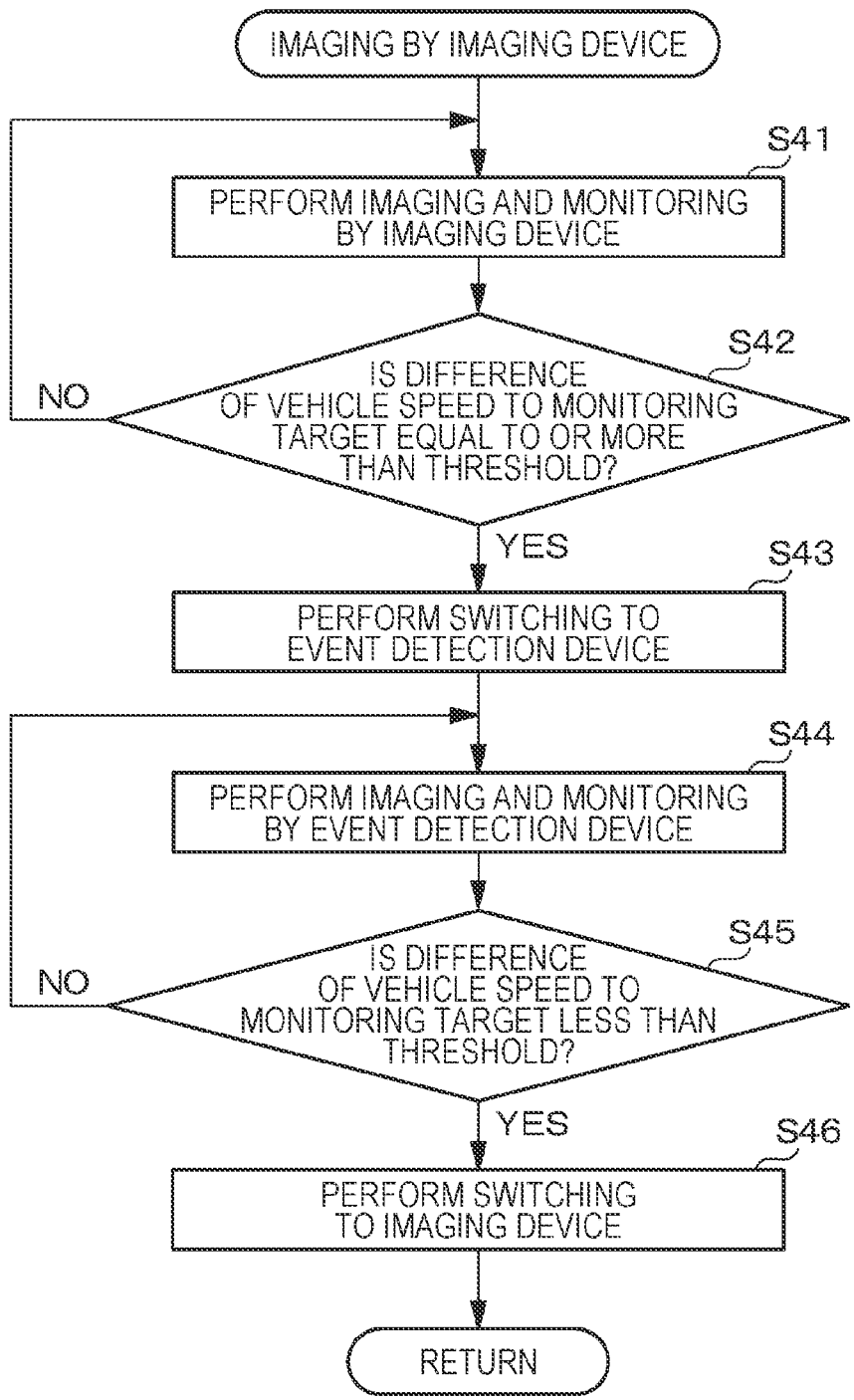
FIG. 19 is a flowchart illustrating an example of control of the imaging device and the event detection device according to Example 4.

In Example 4, the recognition processing of the surroundings of the host vehicle is seamlessly performed at the time of normal traveling by utilizing the respective characteristics of the imaging device 20 and the event detection device 10. An example of control of the imaging device 20 and the event detection device 10 according to Example 4 is illustrated in a flowchart of FIG. 19. The control of the imaging device 20 and the event detection device 10 is executed under the control of the control section 30 in FIG. 13.

The control section 30 monitors the surroundings of the host vehicle, for example, a vehicle or the like approaching the host vehicle from behind at a high speed based on the image captured by the imaging device 20 and acquired by the imaging device 20 (Step S41). During the normal traveling, the control section 30 monitors whether or not a difference between the vehicle speed of the host vehicle and the vehicle speed of the monitoring target vehicle is equal to or more than a predetermined threshold (Step S42).

When the difference between the vehicle speed of the host vehicle and the vehicle speed of the monitoring target vehicle is equal to or more than the threshold (YES in S42), the control section 30 determines that focal plane distortion occurs in the image acquired by the imaging device 20 and the recognition performance is deteriorated. Then, the control section 30 switches from the imaging by the imaging device 20 to the imaging by the event detection device 10 in which focal plane distortion does not occur (Step S43), and monitors the surroundings of the host vehicle based on the image acquired by the event detection device 10 (Step S45). When the vehicle speed difference from the monitoring target vehicle is less than the threshold (NO in S42), the control section 30 returns to Step S41 and continues imaging and monitoring by imaging device 20.

Next, the control section 30 monitors whether or not the vehicle speed difference between the host vehicle and the monitoring target vehicle is less than a predetermined threshold (Step S45), and when the vehicle speed difference is less than the threshold (YES in S45), the imaging by the event detection device 10 is switched to the imaging by the imaging device 20 (Step S46). When the vehicle speed difference from the monitoring target vehicle is equal to or more than the predetermined threshold (NO in S45), the control section 30 returns to Step S44 and continues imaging and monitoring by the event detection device 10.

As described above, the series of processing for seamlessly performing the recognition processing of the surroundings of the host vehicle at the time of normal traveling is ended by making use of the respective characteristics of the imaging device 20 and the event detection device 10, the flow returns to the flow of FIG. 13, and the processing proceeds to Step S14.

As described above, in the control of the imaging device 20 and the event detection device 10 according to Example 4, during normal traveling, the surroundings of the host vehicle are monitored by imaging by the imaging device 20 having a resolution superior to that of the event detection device 10, and processing of image recording and recognition/tracking is performed. Then, in a case where a high-speed moving object approaches at a high speed from behind, for example, the imaging is switched to imaging by the event detection device 10, and the recognition and tracking of the high-speed moving object are continued.

The event detection device 10 is inferior in resolution to the imaging device 20, but can capture an object moving at a high speed without distortion. Therefore, since an object (for example, a vehicle approaching from the rear at a high speed) moving at a high speed can be recognized as an image without distortion, the recognition accuracy can be improved as compared with the case of the imaging device 20 in which the focal plane distortion occurs. Then, various types of control can be performed by passing the recognition result to the imaging system 1 or the in-vehicle system.

Note that, in Example 4, the description has been given as a specific example of imaging by the imaging device 20 in Step S13 in FIG. 4, but the processing can also be generally executed as processing in the case of imaging by the imaging device 20, separately from the processing in Step S13 in FIG. 4.

Furthermore, in the Example 4, the recognition target (monitoring target) is a vehicle approaching the host vehicle at a high speed from the rear, but the recognition target is not limited thereto, and the technology according to the Example 4 is more effective for an object moving at a high speed.

Furthermore, in Example 4, the imaging by the imaging device 20 and the imaging by the event detection device 10 are switched as the vehicle speed difference parameter between the host vehicle and the monitoring target vehicle, but it is also possible to switch from the imaging by the imaging device 20 to the imaging by the event detection device 10 using information such as an intersection, map information, and a direction indicator operation as a trigger. Therefore, in a case of changing the course, merging, and the like, recognition and confirmation of the surrounding situation can be prioritized by the imaging by the event detection device 10.

EXAMPLE 5

Figure 20:
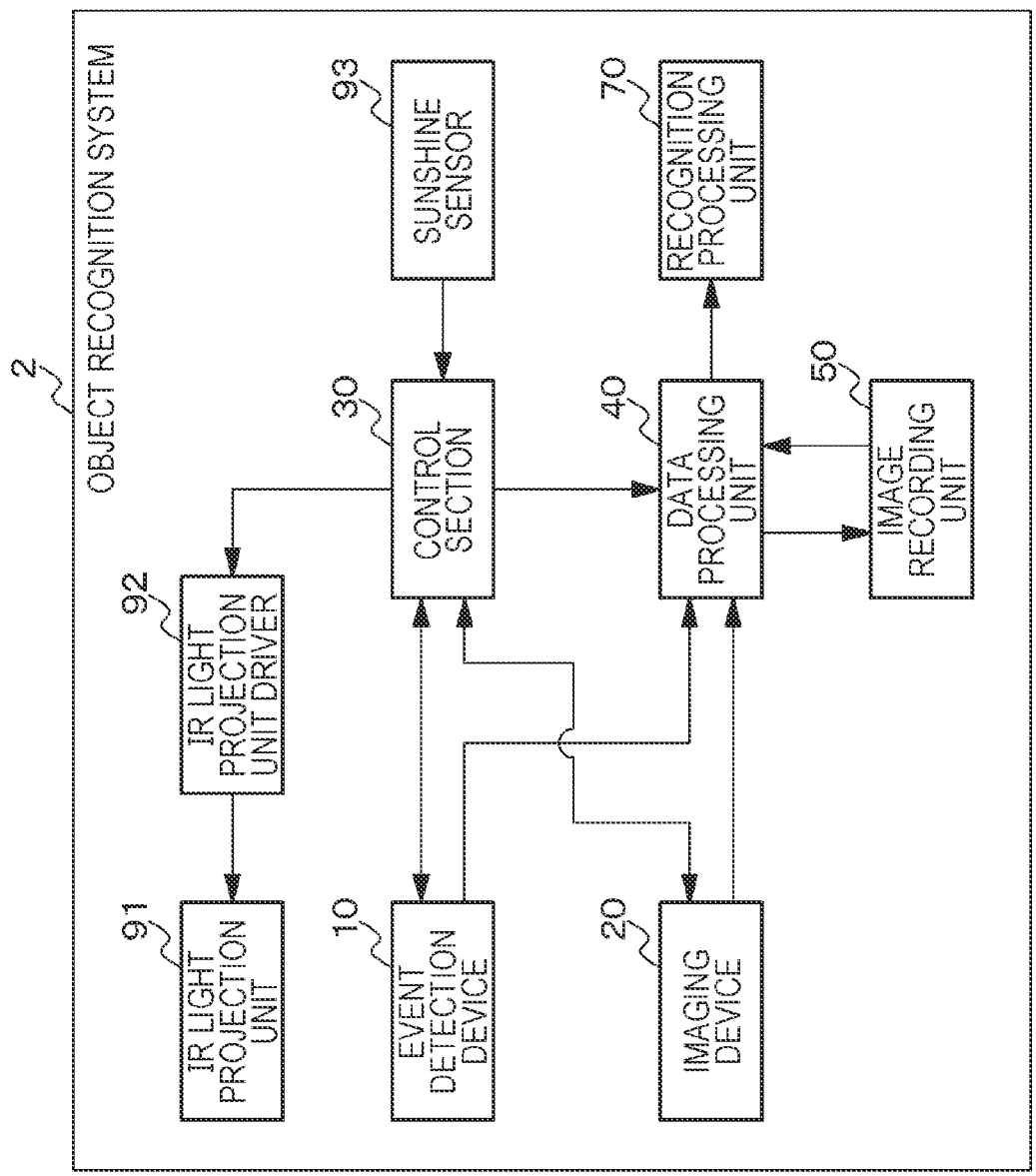
FIG. 20 is a block diagram illustrating an example of a system configuration of an object recognition system according to Example 5.

Example 5 is an example of self-emitting infrared light (IR) in the dark and detecting the presence or absence of an obstacle by the event detection device 10. An example of a system configuration of an object recognition system according to Example 5 is illustrated in a block diagram of FIG. 20.

The object recognition system 2 according to Example 5 includes an IR light projection unit 91, an IR light projection unit driver 92, and a sunlight sensor 93 in addition to the event detection device 10, the imaging device 20, the control section 30, the data processing unit 40, the image recording unit 50, and the recognition processing unit 60 in FIG. 13.

The IR light projection unit 91 includes, for example, a light emitting diode (LED) that emits infrared light having a wavelength of 850 nm, but is not limited thereto. The IR light projection unit driver 92 drives the IR light projection unit 91 under the control of the control section 30. The sunlight sensor 93 is a sensor that detects a degree of sunshine, and particularly detects a dark environment (state) in which visibility is likely to deteriorate. The sunlight sensor 93 is also one of environment sensors in a vehicle control system 7000 (refer to FIG. 25) to be described later.

In order for the event detection device 10 to detect an event such as an obstacle in a dark environment with the IR light projection unit 91 emitting IR light, it is necessary to arrange pixels having sensitivity to IR light in the event detection device 10. Examples of pixel arrays having sensitivity to IR light are illustrated in FIGS. 21A, 21B, 21C, 21D, and 21E.

Figure 21A:
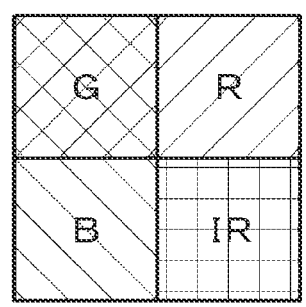
FIGS. 21A, 21B, 21C, 21D, and 21E are diagrams illustrating examples of pixel arrays having sensitivity to infrared light (IR light).
Figure 21B:
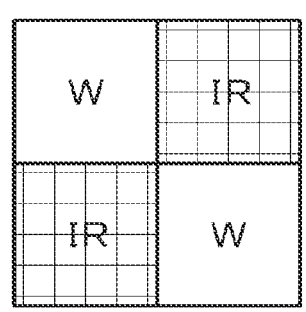
Figure 21C:
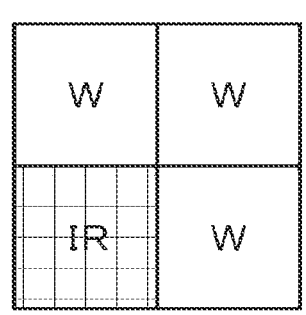
Figure 21D:
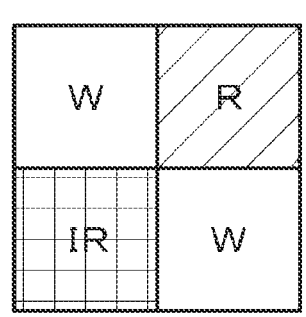
Figure 21E:
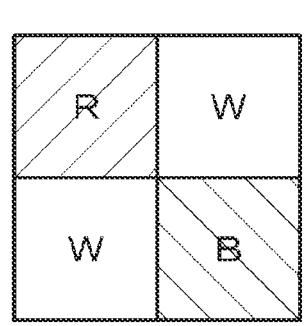

The example of FIG. 21A is a pixel array in which IR pixels are combined with an RGB Bayer array. The example of FIGS. 21B and 21C is a pixel array including a combination of monochrome (W: white) pixels and IR pixels. The example of FIG. 21D is a pixel array including a combination of monochrome pixels, IR pixels, and R pixels so that red of a traffic light can be detected. Note that the pixel array including the IR pixels exemplified here is an example, and the pixel array is not limited to these pixel arrays. For example, a ratio between the IR pixels and other pixels can be changed. Alternatively, since the W pixel has sensitivity including a wavelength of the IR light, as illustrated in FIG. 21E, a pixel array including a combination of an R pixel, a B pixel, and a W pixel can be used without using the IR pixel.

In Example 5, in a place where the surroundings are dark, for example, when the vehicle turns right or left or when the vehicle moves backward, under the control of the control section 30, the IR light projection unit 91 is driven to emit the IR light, and the presence of a pedestrian or a bicycle without a light or the presence or absence of an obstacle such as a wall or a pole is detected as an event by the event detection device 10 having pixels sensitive to IR light. In the case of Example 5, in the IR pixel, an event is detected when a luminance change exceeds a predetermined threshold.

In the dark, the visibility is poor, and the visibility of the host vehicle particularly on the side and the rear is poor, and it is difficult to notice the presence of pedestrians and bicycles without lights or the presence or absence of obstacles such as walls and poles. From this viewpoint, it is preferable that the object recognition system 2 including the IR light projection unit 91 is particularly disposed in a side mirror portion, a rear bumper portion, or a back door portion of the vehicle. Note that, since the traveling direction of the vehicle is usually brightly illuminated by the headlight, basically, it is not necessary to cause the event detection device 10 to emit IR light to detect an event, but the object recognition system 2 including the IR light projection unit 91 may be provided in the front nose portion of the vehicle.

Hereinafter, a specific example of event detection processing under IR light projection in the object recognition system 2 according to Example 5 will be described.

SPECIFIC EXAMPLE 1

FIG. 22 is a flowchart illustrating a flow of a specific example 1 of the event detection processing at the time of IR light projection in the object recognition system 2 according to Example 5. This process is a process executed under the control of the control section 30 in FIG. 13. This similarly applies to a specific example 2 described later.

When the control section 30 receives information indicating that the surrounding environment of the host vehicle has become a predetermined darkness from the sunlight sensor 93 (Step S51), the event detection device 10 is turned on, and the IR light projection unit 91 is turned on with a predetermined light projection amount (Step S52).

Next, the control section 30 determines whether or not an object (event) that does not change for a certain period of time has been detected by the event detection device 10 (Step S53), and when the object that does not chance for a certain period of time has been detected (YES in S53), for example, a notification is given to the vehicle control system 7000 to be described later (Step S54). Here, examples of the object (event) that does not change for a certain period of time and is detected by the event detection device 10 include a pedestrian in the dark and an obstacle such as a wall or a pole.

Upon receiving the notification of object detection from the control section 30, the vehicle control system 7000 notifies the driver that an object (event) exists in the dark, for example, and calls the driver's attention. After the notification to the vehicle control system 7000, the control section 30 turns off the event detection device 10 and the IR light projection unit 91 (Step S55), sends IR light, and ends a series of processes for event detection in a dark environment.

In a case where no object is detected (NO in S53), the control section 30 proceeds to Step S55 and turns off the event detection device 10 and the IR light projection unit 91. Therefore, unnecessary power consumption due to continuation of the on state of the event detection device 10 and the IR light projection unit 91 can be omitted.

Note that the object recognition system 2 according to Example 5 includes the sunlight sensor 93, and starts the event detection processing in the dark environment using the information given from the sunlight sensor 93 as a trigger, but is not limited thereto. For example, the event detection processing can be started with information received from the vehicle control system 7000, for example, ON information of a blinker or information of a steering wheel operation amount as a trigger, or the event detection processing can be started with imaging information of the imaging device 20 as a trigger.

Specific Example 2

In the specific example 1, the light projection amount of the IR light projection unit 91 is set to a predetermined light projection amount, but in a specific example 2, the light projection amount of the IR light projection unit 91 is adjusted according to the brightness around the host vehicle. In this way, it is possible to save unnecessary power consumption in the IR light projection unit 91 as compared with a case where a constant light projection amount is set regardless of ambient brightness.

Figure 23:
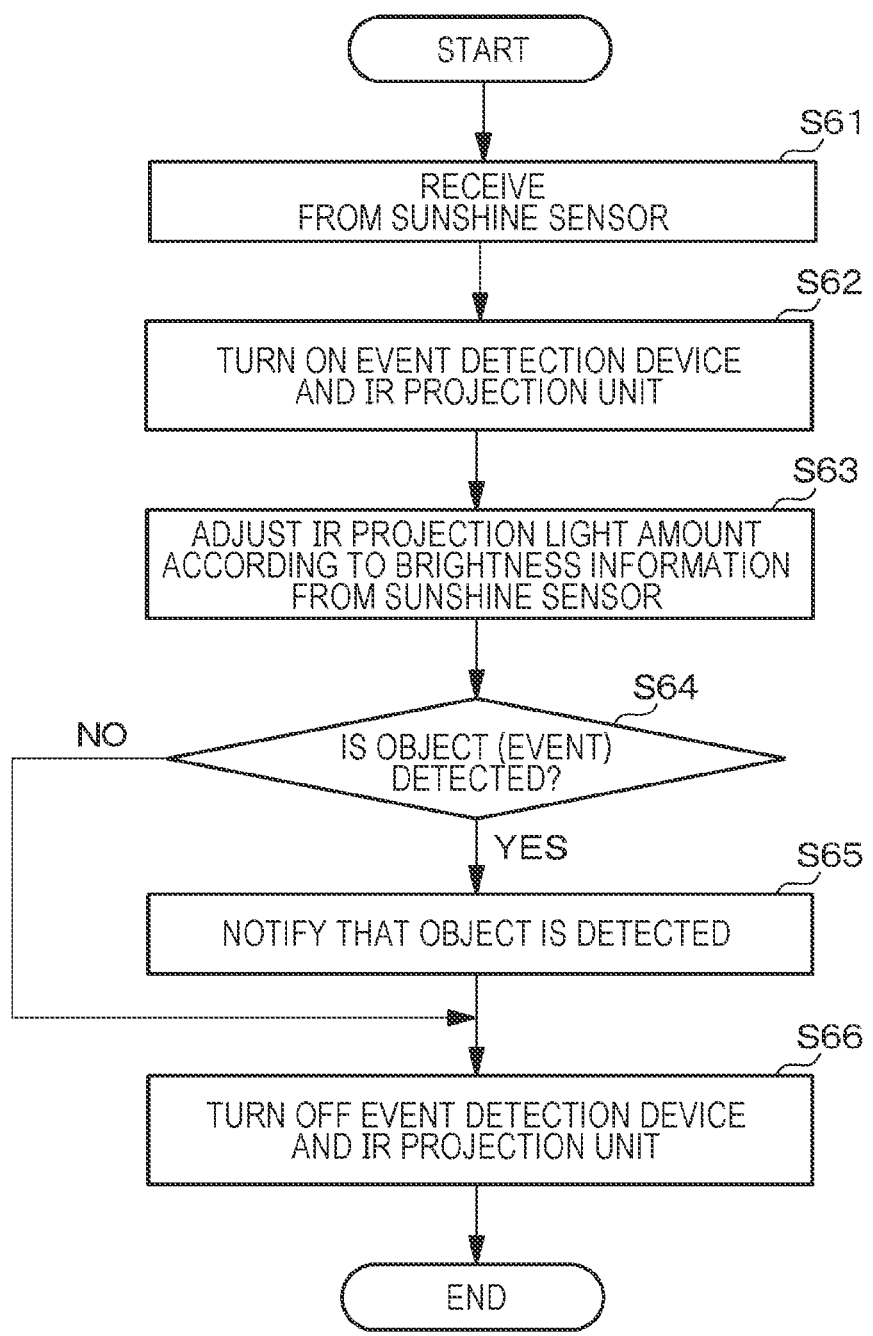
FIG. 23 is a flowchart illustrating a flow of a specific example 2 of the event detection processing at the time of IR light projection in the object recognition system according to Example 5.
Figure 24:
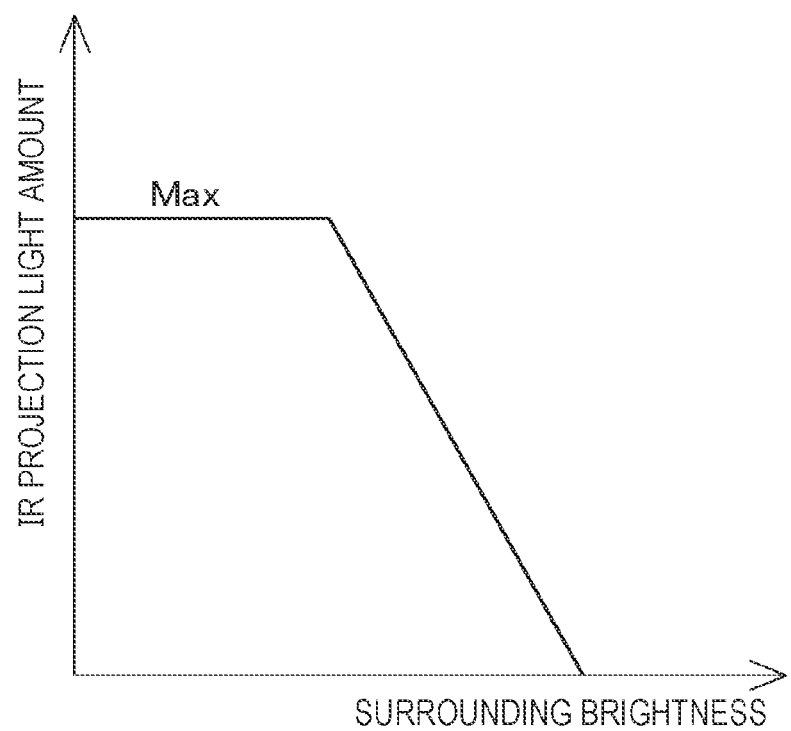
FIG. 24 is a characteristic diagram illustrating a relationship between brightness around a host vehicle and an IR projection light amount.

FIG. 23 is a flowchart illustrating a flow of a specific example 1 of the event detection processing at the time of IR light projection in the object recognition system 2 according to Example 5. Furthermore, FIG. 24 illustrates a relationship between the brightness around the host vehicle and the IR projection light amount.

When the brightness information of the surrounding environment of the host vehicle is received from the sunlight sensor 93 (Step S61), the control section 30 turns on the event detection device 10 and the IR light projection unit 91 (Step S62), and sets the light projection amount of the IR light projection unit 91 to a light projection amount according to the brightness information received from the sunlight sensor 93 (Step S63).

Next, the control section 30 determines whether or not an object (event) that does not change for a certain period of time has been detected by the event detection device 10 (Step S64), and when the object that does not change for a certain period of time has been detected (YES in S64), for example, a notification is given to the vehicle control system 7000 to be described later (Step S65). Here, examples of the object (event) that does not change for a certain period of time and is detected by the event detection device 10 include a pedestrian in the dark and an obstacle such as a wall or a pole.

Upon receiving the notification of object detection from the control section 30, the vehicle control system 7000 notifies the driver that an object (event) exists in the dark, for example, and calls the driver's attention. After the notification to the vehicle control system 7000, the control section 30 turns off the event detection device 10 and the IR light projection unit 91 (Step S66), sends IR light, and ends a series of processes for event detection in a dark environment.

When the event detection device 10 does not detect the object that does not change for a certain period of time (NO in S64), the control section 30 proceeds to Step S66 and turns off the event detection device 10 and the IR light projection unit 91. Therefore, unnecessary power consumption due to continuation of the on state of the event detection device 10 and the IR light projection unit 91 can be omitted.

Note that, in the specific example 2, the light projection amount of the IR light projection unit 91 is adjusted by one stage according to the brightness information received from the sunlight sensor 93, but may be adjusted by multiple stages. For example, in a situation where the brightness of the surrounding environment of the host vehicle is somewhat bright, control may be performed such that the light projection amount of the IR light projection unit 91 is moderately adjusted, and in a case where the surrounding environment is completely dark, the light projection amount of the IR light projection unit 91 is adjusted to the maximum.

MODIFICATION EXAMPLES

Although the technology according to the present disclosure has been described above based on the preferred embodiment, the technology according to the present disclosure is not limited to the embodiment. The configurations and structures of the imaging system and the object recognition system described in the above embodiments are examples and can be changed. For example, in the above embodiment, the pixel signal generation unit 62 provided for each light receiving unit 61 to constitute the pixel 11, but a configuration may be adopted, in which a plurality of light receiving units 31 is formed into a block as a unit, one pixel signal generation unit 62 is provided for each pixel block, and the pixel signal generation unit 62 is shared among the plurality of light receiving units 61 in the pixel block.

<<Application Example of Technology According to Present Disclosure>>

The technology according to the present disclosure can be applied to various products. Hereinafter, a more specific application example will be described. For example, the technology according to the present disclosure may be realized as an imaging system or an object recognition system mounted on any type of moving body such as an automobile, an electric vehicle, a hybrid electric vehicle, a motorcycle, a bicycle, a personal mobility, an airplane, a drone, a ship, a robot, a construction machine, or an agricultural machine (tractor).

<Moving Body>

Figure 25:
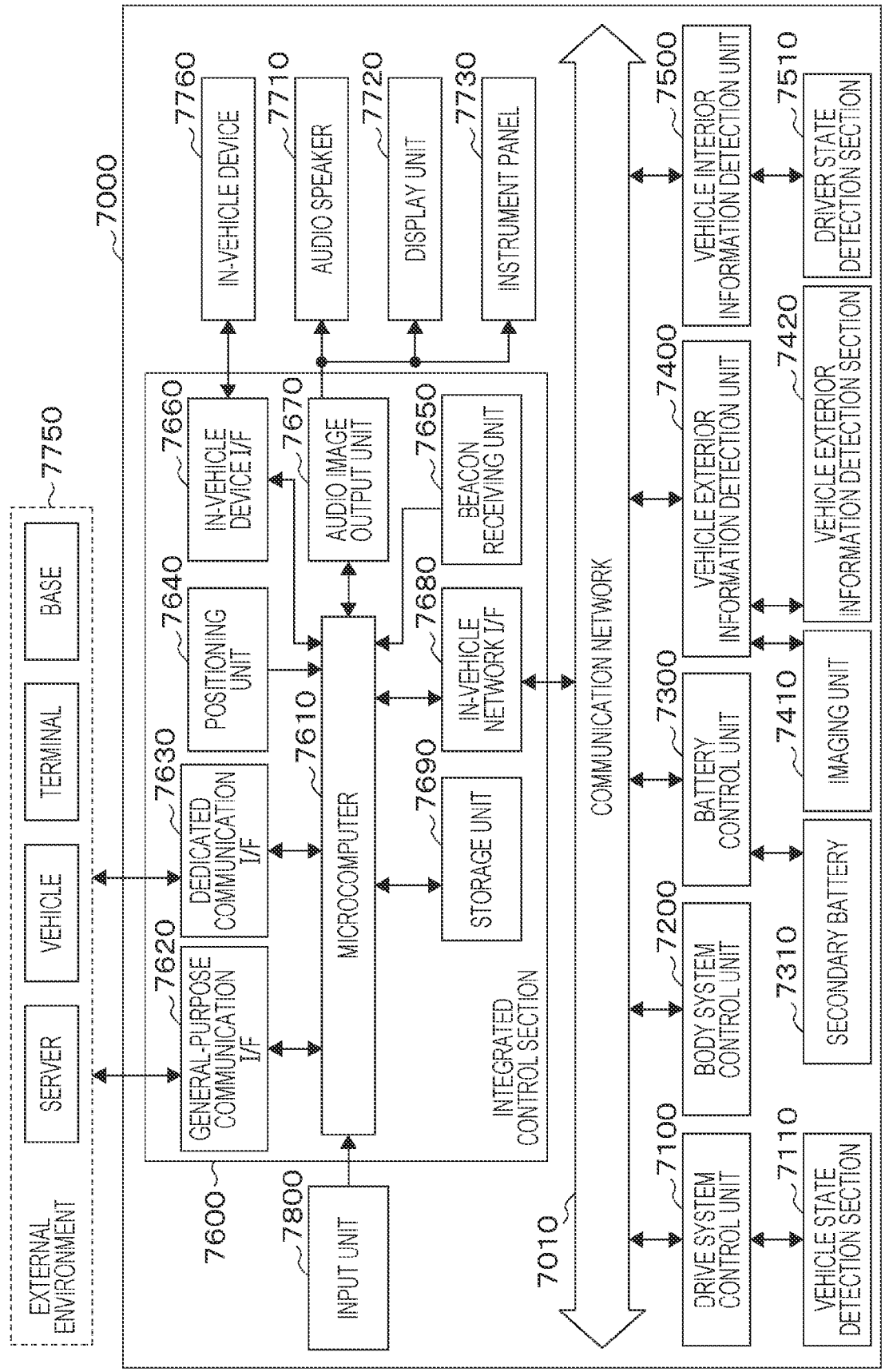
FIG. 25 is a block diagram illustrating a schematic configuration example of a vehicle control system which is an example of a moving body, control system to which a technology according to the present disclosure can be applied.

FIG. 25 is a block diagram illustrating a schematic configuration example of the vehicle control system 7000 which is an example of a moving body control system to which the technology according to the present disclosure can be applied. The vehicle control system 7000 includes a plurality of electronic control units connected via a communication network 7010. In the example illustrated in FIG. 25, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting the plurality of control units may be, for example, an in-vehicle communication network conforming to an arbitrary standard such as a controller area network (CAN), a local interconnect network (LIN), a local area network (LAN), or FlexRay (registered trademark).

Each control unit includes a microcomputer that performs arithmetic processing according to various programs, a storage unit that stores programs executed by the microcomputer, parameters used for various calculations, or the like, and a drive circuit that drives various devices to be controlled. Each control unit includes a network I/F for communicating with other control units via the communication network 7010, and a communication I/F for communicating with devices, sensors, or the like inside and outside the vehicle by wired communication or wireless communication. In FIG. 25, as a functional configuration of the integrated control unit 7600, the microcomputer 7610, a general-purpose communication I/F 7620, a dedicated communication I/F 7630, a positioning unit 7640, a beacon receiving unit 7650, an in-vehicle device I/F 7660, an audio image output unit 7670, an in-vehicle network I/F 7680, and a storage unit 7690 are illustrated. The other control units similarly include a microcomputer, a communication I/F, a storage unit, and the like.

The drive system control unit 7100 controls the operation of devices related to the drive system of the vehicle according to various programs. For example, the drive system control unit 7100 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like. The drive system control unit 7100 may have a function as a control device such as an antilock brake system (ABS) or an electronic stability control (ESC).

A vehicle state detection section 7110 is connected to the drive system control unit 7100. The vehicle state detection section 7110 includes, for example, at least one of a gyro sensor that detects an angular velocity of axial rotational motion of a vehicle body, an acceleration sensor that detects acceleration of the vehicle, or a sensor for detecting an operation amount of an accelerator pedal, an operation amount of a brake pedal, a steering angle of a steering wheel, an engine speed, a wheel rotation speed, or the like. The drive system control unit 7100 performs arithmetic processing using a signal input from the vehicle state detection section 7110, and controls an internal combustion engine, a driving motor, an electric power steering device, a brake device, and the like.

The body system control unit 7200 controls operations of various devices mounted on the vehicle body according to various programs. For example, the body system control unit 7200 functions as a control device of a keyless entry system, a smart key system, a power window device, or various lamps such as a head lamp, a back lamp, a brake lamp, a blinker, or a fog lamp. In this case, radio waves transmitted from a portable device that substitutes for a key or signals of various switches can be input to the body system control unit 7200. The body system control unit 7200 receives input of these radio waves or signals, and controls a door lock device, a power window device, a lamp, and the like of the vehicle.

The battery control unit 7300 controls a secondary battery 7310, which is a power supply source of the driving motor, according to various programs. For example, information such as a battery temperature, a battery output voltage, or a remaining capacity of a battery is input to the battery control unit 7300 from a battery device including the secondary battery 7310. The battery control unit 7300 performs arithmetic processing using these signals, and performs temperature adjustment control of the secondary battery 7310 or control of a cooling device or the like included in the battery device.

The vehicle exterior information detection unit 7400 detects information outside the vehicle on which the vehicle control system 7000 is mounted. For example, at least one of an imaging unit 7410 or a vehicle exterior information detection section 7420 is connected to the vehicle exterior information detection unit 7400. The imaging unit 7410 includes at least one of a time of flight (ToF) camera, a stereo camera, a monocular camera, an infrared camera, or other cameras. The vehicle exterior information detection section 7420 includes, for example, at least one of an environment sensor for detecting current weather or climate, or a surrounding information detection sensor for detecting another vehicle, an obstacle, a pedestrian, or the like around the vehicle on which the vehicle control system 7000 is mounted.

The environment sensor may be, for example, at least one of a raindrop sensor that detects rainy weather, a fog sensor that detects fog, a sunlight, sensor that detects a degree of sunshine, or a snow sensor that detects snowfall. The surrounding information detection sensor may be at least one of an ultrasonic sensor, a radar device, or a light detection and ranging, laser imaging detection and ranging (LIDAR) device. The imaging unit 7410 and the vehicle exterior information detection section 7420 may be provided as independent sensors or devices, or may be provided as a device in which a plurality of sensors or devices is integrated.

Figure 26:
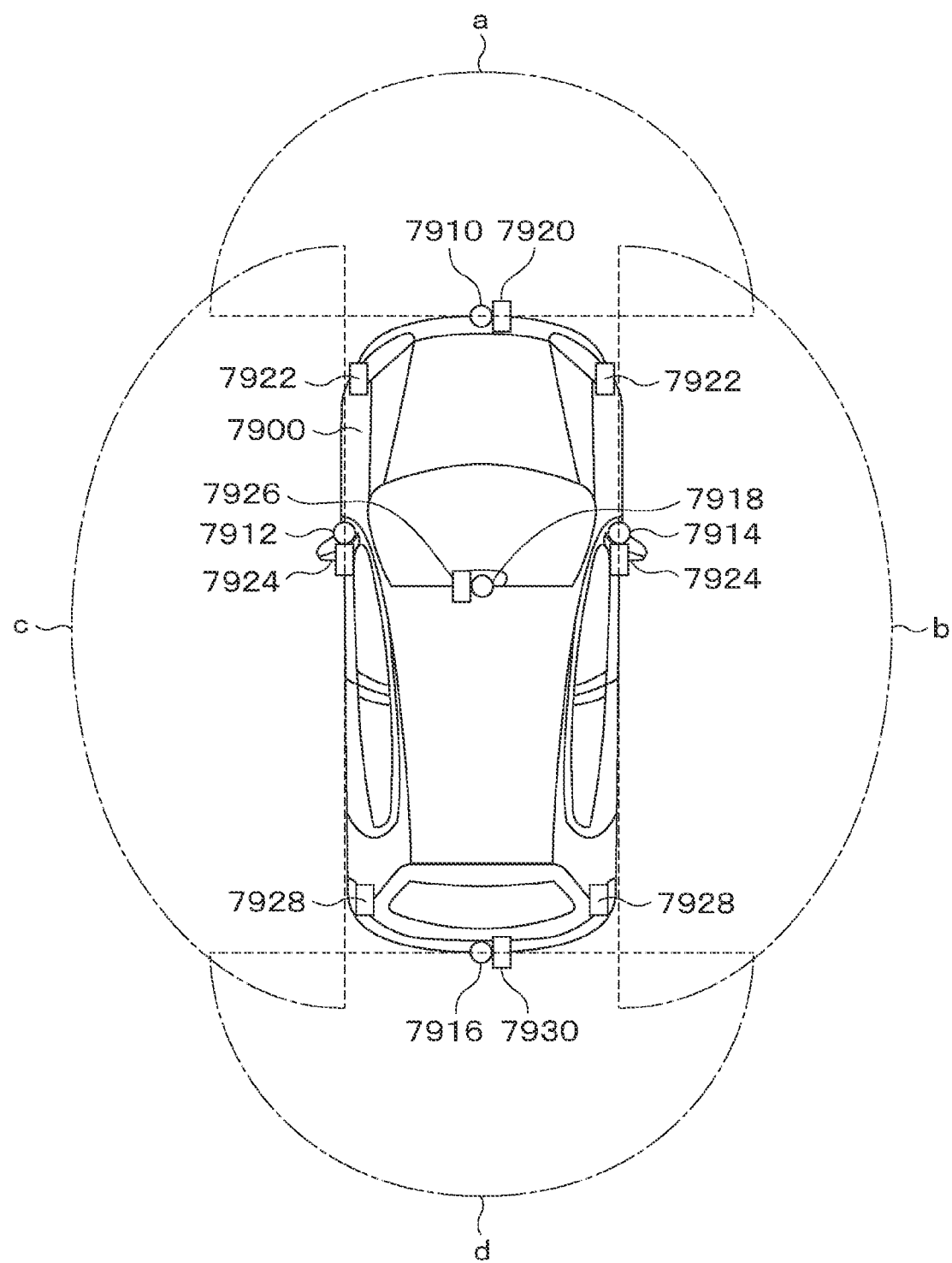
FIG. 26 is a view illustrating an example of an installation position of an imaging unit in the vehicle control system.

Here, FIG. 26 illustrates an example of installation positions of the imaging unit 7410 and the vehicle exterior information detection section 7420. The imaging units 7910, 7912, 7914, 7916, and 7918 are provided, for example, in at least one of a front nose, a side mirror, a rear bumper, a back door, or an upper portion of a windshield in a vehicle interior of the vehicle 7900. The imaging unit 7910 provided at the front nose and the imaging unit 7918 provided at the upper portion of the windshield in the vehicle interior mainly acquire images in front of the vehicle 7900. The imaging units 7912 and 7914 provided at the side mirrors mainly acquire images of the sides of the vehicle 7900. The imaging unit 7916 provided on the rear bumper or the back door mainly acquires an image behind the vehicle 7900. The imaging unit 7918 provided at the upper portion of the windshield in the vehicle interior is mainly used to detect a preceding vehicle, a pedestrian, an obstacle, a traffic light, a traffic sign, a lane, or the like.

Note that FIG. 26 illustrates an example of imaging ranges of the respective imaging units 7910, 7912, 7914, and 7916. An imaging range a indicates an imaging range of the imaging unit 7910 provided at the front nose, imaging ranges b and c indicate imaging ranges of the imaging units 7912 and 7914 provided at the side mirrors, respectively, and an imaging range d indicates an imaging range of the imaging unit 7916 provided at the rear bumper or the back door. For example, by superimposing image data captured by the imaging units 7910, 7912, 7914, and 7916, an overhead view image of the vehicle 7900 viewed from above can be obtained.

Vehicle exterior information detection sections 7920, 7922, 7924, 7926, 7928, and 7930 provided at the front, rear, sides, corners, and the upper portion of the windshield in the vehicle interior of the vehicle 7900 may be, for example, ultrasonic sensors or radar devices. The vehicle exterior information detection sections 7920, 7926, and 7930 provided at the front nose, the rear bumper, the back door, and the upper portion of the windshield in the vehicle interior of the vehicle 7900 may be, for example, LIDAR devices. These vehicle exterior information detection sections 7920 to 7930 are mainly used for detecting a preceding vehicle, a pedestrian, an obstacle, or the like.

Returning to FIG. 25, the description will be continued. The vehicle exterior information detection unit 7400 causes the imaging unit 7410 to capture an image outside the vehicle, and receives the captured image data. Furthermore, the vehicle exterior information detection unit 7400 receives detection information from the connected vehicle exterior information detection section 7420. In a case where the vehicle exterior information detection section 7420 is an ultrasonic sensor, a radar device, or a LIDAR device, the vehicle exterior information detection unit 7400 transmits ultrasonic waves, electromagnetic waves, and the like, and receives information of received reflected waves. The vehicle exterior information detection unit 7400 may perform object detection processing or distance detection processing on a person, a vehicle, an obstacle, a sign, a character on a road surface, and the like based on the received information. The vehicle exterior information detection unit 7400 may perform environment recognition processing of recognizing rainfall, fog, road surface conditions, and the like based on the received information. The vehicle exterior information detection unit 7400 may calculate a distance to an object outside the vehicle based on the received information.

Furthermore, the vehicle exterior information detection unit 7400 may perform image recognition processing or distance detection processing of recognizing a person, a car, an obstacle, a sign, a character on a road surface, or the like based on the received image data. The vehicle exterior information detection unit 7400 may perform processing such as distortion correction or alignment on the received image data, and combine image data captured by different imaging units 7410 to generate an overhead view image or a panoramic image. The vehicle exterior information detection unit 7400 may perform viewpoint conversion processing using image data captured by different imaging units 7410.

The vehicle interior information detection unit 7500 detects information inside the vehicle. For example, a driver state detection section 7510 that detects a state of a driver is connected to the vehicle interior information detection unit 7500. The driver state detection section 7510 may include a camera that images the driver, a biological sensor that detects biological information of the driver, a microphone that collects sound in the vehicle interior, and the like. The biological sensor is provided, for example, on a seat surface, a steering wheel, and the like, and detects biological information of an occupant sitting on a seat or a driver holding the steering wheel. The vehicle interior information detection unit 7500 may calculate a degree of fatigue or a degree of concentration of the driver or may determine whether or not the driver is dozing based on the detection information input from the driver state detection section 7510. The vehicle interior information detection unit 7500 may perform processing such as noise canceling processing on the collected sound signal.

The integrated control unit 7600 controls the overall operation in the vehicle control system 7000 according to various programs. An input unit 7800 is connected to the integrated control unit 7600. The input unit 7800 is realized by, for example, a device such as a touch panel, a button, a microphone, a switch, or a lever that can be operated by an occupant for input. Data obtained by performing voice recognition on the voice input by the microphone may be input to the integrated control unit 7600. The input unit 7800 may be, for example, a remote control device using infrared rays or other radio waves, or an external connection device such as a mobile phone or a personal digital assistant (PDA) corresponding to the operation of the vehicle control system 7000. The input unit 7800 may be, for example, a camera, and in this case, the occupant can input information by gesture. Alternatively, data obtained by detecting a movement of a wearable device worn by the occupant may be input. Moreover, the input unit 7800 may include, for example, an input control circuit and the like that generates an input signal based on information input by the occupant and the like using the input unit 7800 and outputs the input signal to the integrated control unit 7600. By operating the input unit 7800, the occupant and the like input various data to the vehicle control system 7000 or instruct a processing operation.

The storage unit 7690 may include a read only memory (ROM) that stores various programs to be executed by the microcomputer, and a random access memory (RAM) that stores various parameters, calculation results, sensor values, and the like. Furthermore, the storage unit 7690 may be realized by a magnetic storage device such as a hard disc drive (HDD), a semiconductor storage device, an optical storage device, a magneto-optical storage device, and the like.

The general-purpose communication I/F 7620 is a general-purpose communication I/F that mediates communication with various devices existing in an external environment 7750. The general-purpose communication I/F 7620 may implement a cellular communication protocol such as global system of mobile communications (GSM) (registered trademark), WiMAX, long term evolution (LTE), or LTE-advanced (LTE-A), or another wireless communication protocol such as wireless LAN (also referred to as Wi-Fi (registered trademark)) or Bluetooth (registered trademark). The general-purpose communication I/F 7620 may be connected to a device (for example, an application server or a control server) existing on an external network (for example, the Internet, a cloud network, or a company-specific network) via, for example, a base station or an access point. Furthermore, the general-purpose communication I/F 7620 may be connected to a terminal (for example, a terminal of a driver, a pedestrian, or a store, or a machine type communication (MTC) terminal) existing in the vicinity of the vehicle using, for example, a peer to peer (P2P) technology.

The dedicated communication I/F 7630 is a communication I/F that supports a communication protocol formulated for use in a vehicle. For example, the dedicated communication I/F 7630 may implement a standard protocol such as wireless access in vehicle environment (WAVE) which is a combination of IEEE 802.11p of the lower layer and IEEE 1609 of the upper layer, dedicated short range communications (DSRC), or a cellular communication protocol. The dedicated communication I/F 7630 typically performs V2X communication which is a concept including one or more of vehicle to vehicle communication, vehicle to infrastructure communication, vehicle to home communication, and vehicle to pedestrian communication.

The positioning unit 7640 receives, for example, a global navigation satellite system (GNSS) signal from a GNSS satellite (for example, a global positioning system (GPS) signal from a GPS satellite), executes positioning, and generates position information including latitude, longitude, and altitude of the vehicle. Note that the positioning unit 7640 may specify the current position by exchanging signals with a wireless access point, or may acquire the position information from a terminal such as a mobile phone, a PHS, or a smartphone having a positioning function.

The beacon receiving unit 7650 receives, for example, radio waves or electromagnetic waves transmitted from a wireless station or the like installed on a road, and acquires information such as a current position, a traffic jam, a closed road, a required time, or the like. Note that the function of the beacon receiving unit 7650 may be included in the dedicated communication I/F 7630 described above.

The in-vehicle device I/F 7660 is a communication interface that mediates connection between the microcomputer 7610 and various in-vehicle devices 7760 existing in the vehicle. The in-vehicle device I/F 7660 may establish wireless connection using a wireless communication protocol such as wireless LAN, Bluetooth (registered trademark), near field communication (NFC), or wireless USB (WUSB). Furthermore, the in-vehicle device I/F 7660 may establish wired connection such as universal serial bus (USB), high-definition multimedia interface (HDMI) (registered trademark), or mobile high-definition link (MHL) via a connection terminal (and, if necessary, a cable) not illustrated. The in-vehicle device 7760 may include, for example, at least one of a mobile device or a wearable device possessed by an occupant, or an information device carried in or attached to the vehicle. Furthermore, the in-vehicle device 7760 may include a navigation device that searches for a route to an arbitrary destination. The in-vehicle device I/F 7660 exchanges a control signal or a data signal with these in-vehicle devices 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 according to various programs based on information acquired via at least one of the general-purpose communication I/F 7620, the dedicated communication I/F 7630, the positioning unit 7640, the beacon receiving unit 7650, the in-vehicle device I/F 7660, or the in-vehicle network I/F 7680. For example, the microcomputer 7610 may calculate a control target value of the driving force generation device, the steering mechanism, or the braking device based on the acquired information regarding the inside and outside of the vehicle, and output a control command to the drive system control unit 7100. For example, the microcomputer 7610 may perform cooperative control for the purpose of implementing functions of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, and the like. Furthermore, the microcomputer 7610 may perform cooperative control for the purpose of automatic driving and the like in which the vehicle autonomously travels without depending on the operation of the driver by controlling the driving force generation device, the steering mechanism, the braking device, and the like based on the acquired information around the vehicle.

The microcomputer 7610 may generate three-dimensional distance information between the vehicle and an object such as a surrounding structure or a person based on information acquired via at least one of the general-purpose communication I/F 7620, the dedicated communication I/F 7630, the positioning unit 7640, the beacon receiving unit 7650, the in-vehicle device I/F 7660, or the in-vehicle network I/F 7680, and create local map information including surrounding information of the current position of the vehicle. Furthermore, the microcomputer 7610 may predict danger such as collision of the vehicle, approach of a pedestrian and the like, or entry into a closed road based on the acquired information, and generate a warning signal. The warning signal may be, for example, a signal for generating a warning sound or turning on a warning lamp.

The audio image output unit 7670 transmits an output signal of at least one of a sound or an image to an output device capable of visually or audibly notifying an occupant of the vehicle or the outside of the vehicle of information. In the example of FIG. 25, an audio speaker 7710, a display unit 7720, and an instrument panel 7730 are illustrated as the output device. The display unit 7720 may include, for example, at least one of an on-board display and a head-up display. The display unit 7720 may have an augmented reality (AR) display function. The output device may be another device other than these devices, such as a wearable device such as a headphone or an eyeglass-type display worn by an occupant, a projector, or a lamp. In a case where the output device is a display device, the display device visually displays results obtained by various processes performed by the microcomputer 7610 or information received from another control unit in various formats such as text, images, tables, and graphs. Furthermore, in a case where the output device is a sound output device, the sound output device converts an audio signal including reproduced sound data, acoustic data, or the like into an analog signal and aurally outputs the analog signal.

Note that, in the example illustrated in FIG. 25, at least two control units connected via the communication network 7010 may be integrated as one control unit. Alternatively, each control unit may include a plurality of control units. Moreover, the vehicle control system 7000 may include another control unit (not shown). Furthermore, in the above description, some or all of the functions performed by any of the control units may be provided to another control unit. That is, as long as information is transmitted and received via the communication network 7010, predetermined arithmetic processing may be performed by any control unit. Similarly, a sensor or a device connected to any of the control units may be connected to another control unit, and a plurality of control units may mutually transmit and receive detection information via the communication network 7010.

An example of the vehicle control system to which the technology according to the present disclosure can be applied has been described above. The technology according to the present disclosure can be applied to, for example, the imaging units 7910, 7912, 7914, 7916, 7918, and the like among the above-described configurations. Specifically, the imaging system of the present disclosure can be applied to these imaging units. An imaging system of the present disclosure includes an event detection device including an asynchronous imaging device called DVS and a synchronous imaging device, and acquires image information of a region including an event by the imaging device after detecting the event by the event detection device. Therefore, after detecting the event, the object recognition of the event can be performed more accurately based on the image information acquired by the imaging device, and thus, it is possible to contribute to realization of safe vehicle travel.

<<Configuration that can be Taken by Present Disclosure>>

Note that the present disclosure can also have the following configurations.

<A. Imaging System>

[A-1] An imaging system mounted on and used in a moving body, the imaging system including
an event detection device that detects, as an event, that a luminance change of a pixel that photoelectrically converts incident light exceeds a predetermined threshold;
an imaging device that captures an image at a fixed frame rate; and
a control sect on that controls the event detection device and the imaging device,
in which the control section performs control to acquire image information of a region including the event by the imaging device in response to the event detection device detecting the event.

[A-2] The imaging system according to [A-1],
in which the event detection device acquires an image, and
the control section detects a state of a road surface based on the image acquired by the event detection device.

[A-3] The imaging system according to [A-2],
in which the control section divides the image acquired by the event detection device into regions, and detects the state of the road surface based on a state change amount per unit area obtained from the image obtained by the region division.

[A-4] The imaging system according to [A-3],
in which in a case where the number of regions in which the state change amount per unit area is equal to or more than a predetermined threshold is equal to or more than a predetermined set value, the control section determines that a damaged portion exists on the road surface.

[A-5] The imaging system according to [A-4],
in which when the control section determines that there is a damaged portion on the road surface, the control section notifies a control system of the moving body of a determination result.

[A-6] The imaging system according to any one of [A-2] to [A-5],
in which the control section performs control to dynamically change the threshold for determining the state of the road surface according to a situation outside the moving body.

[A-7] The imaging system according to [A-6],
in which the control section determines the situation outside the moving body based on information given from an environment sensor attached to the moving body.

[A-8] The imaging system according to [A-1],
in which in a case where a difference between a vehicle speed of a host vehicle and a vehicle speed of a monitoring target vehicle is equal to or more than a predetermined threshold in a state where surroundings are monitored based on the image acquired by the imaging device, the control section executes switching from imaging by the imaging device to imaging by the event detection device, and monitors the surroundings based on the image acquired by the event detection device.

[A-9] The imaging system according to [A-8],
in which in a case where a difference between the vehicle speed of the host vehicle and the vehicle speed of the monitoring target vehicle is less than the predetermined threshold in a state where the surroundings are monitored based on the image acquired by the event detection device, the control section executes switching from the imaging by the imaging device and the imaging by the event detection device to the imaging by the imaging device.

[A-10] The imaging system according to [A-1], further including
an infrared light projection unit that projects infrared light.

[A-11] The imaging system according to [A-10], further including
a sunlight sensor, in which the control section turns on the infrared light projection unit by using information given from the sunlight sensor as a trigger.

[A-12] The imaging system according to [A-11],
in which the event detection device includes a pixel having sensitivity to infrared light.

[A-13] The imaging system according to [A-12],
in which the event detection device detects an event based on a luminance change of a pixel having sensitivity to infrared light in an environment where the infrared light is projected by the infrared light projection unit.

[A-14] The imaging system according to [A-13],
in which the control section notifies the control system of the moving body of a detection result in a case where the event detection device detects an event that does not change for a certain period of time.

[A-15] The imaging system according to [A-13],
in which the control section turns off the infrared light projection unit in a case where the event detection device does not detect an event that does not change for a certain period of time when the infrared light projection unit is turned off.

[A-16] The imaging system according to any one of [A-10] to [A-15],
in which the control section sets an infrared light projection light amount of the infrared light projection unit according to brightness information given from the sunlight sensor.

[A-17] The imaging system according to [A-16],
in which the control section adjusts the infrared light projection light amount of the infrared light projection unit in multiple stages according to the brightness information given from the sunlight sensor.

<B. Object Recognition System>

[B-1] An object recognition system mounted on and used in a moving body, the object recognition system including:
an event detection device that detects, as an event, that a luminance change of a pixel that photoelectrically converts incident light exceeds a predetermined threshold;
an imaging device that captures an image at a fixed frame rate; and
a control section that controls the event detection device and the imaging device,
in which under a control of the control section, after the event is detected by the event detection device, image information of a region including the event is acquired by the imaging device, and object recognition is performed based on the acquired image information.

[B-2] The object recognition system according to [B-1],
in which the event detection device acquires an image, and
the control section detects a state of a road surface based on the image acquired by the event detection device.

[B-3] The object recognition system according to [B-2],
in which the control section divides the image acquired by the event detection device into regions, and detects the state of the road surface based on a state change amount per unit area obtained from the image obtained by the region division.

[B-4] The object recognition system according to [B-3],
in which in a case where the number of regions in which the state change amount per unit area is equal to or more than a predetermined threshold is equal to or more than a predetermined set value, the control section determines that a damaged portion exists on the road surface.

[B-5] The object recognition system according to [B-4],
in which when the control section determines that there is a damaged portion on the road surface, the control section notifies a control system of the moving body of a determination result.

[B-6] The object recognition system according to any one of [B-2] to [B-5],
in which the control section performs control to dynamically change the threshold for determining the state of the road surface according to a situation outside the moving body.

[B-7] The object recognition system according to [B-6],
in which the control section determines the situation outside the moving body based on information given from an environment sensor attached to the moving body.

[B-8] The object recognition system according to [B-1],
in which in a case where a difference between a vehicle speed of a host vehicle and a vehicle speed of a monitoring target vehicle is equal to or more than a predetermined threshold in a state where surroundings are monitored based on the image acquired by the imaging device, the control section executes switching from imaging by the imaging device to imaging by the event detection device, and monitors the surroundings based on the image acquired by the event detection device.

[B-9] The object recognition system according to [B-8],
in which in a case where a difference between the vehicle speed of the host vehicle and the vehicle speed of the monitoring target vehicle is less than the predetermined threshold in a state where the surroundings are monitored based on the image acquired by the event detection device, the control section executes switching from the imaging by the imaging device and the imaging by the event detection device to the imaging by the imaging device.

[B-10] The object recognition system according to [B-1], further including
an infrared light projection unit that projects infrared light.

[B-11] The object recognition system according to [B-10], further including
a sunlight sensor,
in which the control section turns on the infrared light projection unit by using information given from the sunlight sensor as a trigger.

[B-12] The object recognition system according to [B-11],
in which the event detection device includes a pixel having sensitivity to infrared light

[B-13] The object recognition system according to [B-12],
in which the event detection device detects an event based on a luminance change of a pixel having sensitivity to infrared light in an environment where the infrared light is projected by the infrared light projection unit.

[B-14] The object recognition system according to [B-13],
in which the control section notifies the control system of the moving body of a detection result in a case where the event detection device detects an event that does not change for a certain period of time.

[B-15] The object recognition system according to [B-13],
in which the control section turns off the infrared light projection unit in a case where the event detection device does not detect an event that does not change for a certain period of time when the infrared light projection unit is turned off.

[B-16] The object recognition system according to any one of [B-10] to [B-15],
in which the control section sets an infrared light projection lights amount of the infrared light projection unit according to brightness information given from the sunlight sensor.

[B-17] The object recognition system according to [B-16],
in which the control section adjusts the infrared light projection light amount of the infrared light projection unit in multiple stages according to the brightness information given from the sunlight sensor.

REFERENCE SIGNS LIST

1 Imaging system
2 Object recognition system
10 Event detection device
11 Pixel
12 Pixel array unit
13 Drive unit
14 Arbiter portion (arbitration portion)
15 Column processing unit
16 Signal processing unit
20 Imaging device
21 Pixel
22 Pixel array unit
23 Row selector
24 Constant current source unit
25 Analog-digital conversion unit
26 Horizontal transfer scanning unit
27 Signal processing unit
28 Timing control section
30 Control section
40 Data processing unit
50 Image recording unit
60 Recognition processing unit
61 Light receiving unit
62 Pixel signal generation unit
63 Event detection section
80 Vehicle exterior information acquisition unit
91 IR light projection unit
92 IR light projection unit driver
93 Sunlight sensor

The invention claimed is:

1. An imaging system mounted on and used in a moving body, the imaging system comprising:
event detection circuitry configured to detect, as an event, that a luminance change of a pixel that photoelectrically converts incident light exceeds a predetermined threshold;
imaging circuitry configured to capture an image at a fixed frame rate; and
control circuitry configured to control the event detection circuitry and the imaging circuitry, wherein
the control circuitry performs control to acquire image information of a region including the event in response to the event detection circuitry detecting the event,
the event detection circuitry acquires the image,
the control circuitry detects a state of a road surface based on the image acquired by the event detection circuitry, and
the control circuitry divides the image acquired by the event detection circuitry into regions, and detects the state of the road surface based on a state change amount per unit area obtained from the image obtained by the region division.

2. The imaging system according to claim 1,
wherein in a case where the number of regions in which the state change amount per unit area is equal to or more than a predetermined threshold is equal to or more than a predetermined set value, the control circuitry determines that a damaged portion exists on the road surface.

3. The imaging system according to claim 2,
wherein when the control circuitry determines that there is a damaged portion on the road surface, the control circuitry notifies a control system of the moving body of a determination result.

4. The imaging system according to claim 1,
wherein the control circuitry performs control to dynamically change the threshold for determining the state of the road surface according to a situation outside the moving body.

5. The imaging system according to claim 4,
wherein the control circuitry determines the situation outside the moving body based on information given from an environment sensor attached to the moving body.

6. An imaging system mounted on and used in a moving body, the imaging system comprising:
event detection circuitry configured to detect, as an event, that a luminance change of a pixel that photoelectrically converts incident light exceeds a predetermined threshold;
imaging circuitry configured to capture an image at a fixed frame rate; and
control circuitry configured to control the event detection circuitry and the imaging circuitry, wherein
the control circuitry performs control to acquire image information of a region including the event in response to the event detection circuitry detecting the event,
the event detection circuitry acquires the image, and
in a case where a difference between a vehicle speed of a host vehicle and a vehicle speed of a monitoring target vehicle is equal to or more than a predetermined threshold in a state where surroundings are monitored based on the image acquired by the imaging circuitry, the control circuitry executes switching from imaging by the imaging circuitry to imaging by the event detection circuitry, and monitors the surroundings based on the image acquired by the event detection circuitry.

7. The imaging system according to claim 6,
wherein in a case where a difference between the vehicle speed of the host vehicle and the vehicle speed of the monitoring target vehicle is less than the predetermined threshold in a state where the surroundings are monitored based on the image acquired by the event detection circuitry, the control circuitry executes switching from the imaging by the imaging circuitry and the imaging by the event detection circuitry to the imaging by the imaging circuitry.

8. The imaging system according to claim 1, further comprising comprising:
an infrared light projector unit that projects infrared light.

9. The imaging system according to claim 8, further comprising:
a sunlight sensor,
wherein the control circuitry turns on the infrared light projection unit by using information given from the sunlight sensor as a trigger.

10. The imaging system according to claim 9,
wherein the event detection circuitry includes a pixel having sensitivity to infrared light.

11. The imaging system according to claim 10,
wherein the event detection circuitry detects an event based on a luminance change of a pixel having sensitivity to infrared light in an environment where the infrared light is projected by the infrared light projection unit.

12. The imaging system according to claim 11,
wherein the control circuitry notifies the control system of the moving body of a detection result in a case where the event detection circuitry detects an event that does not change for a certain period of time.

13. The imaging system according to claim 11,
wherein the control circuitry turns off the infrared light projection unit in a case where the event detection circuitry does not detect an event that does not change for a certain period of time when the infrared light projection unit is turned off.

14. The imaging system according to claim 8,
wherein the control circuitry sets an infrared light projection light amount of the infrared light projection unit according to brightness information given from the sunlight sensor.

15. The imaging system according to claim 14,
wherein the control circuitry adjusts the infrared light projection light amount of the infrared light projection unit in multiple stages according to the brightness information given from the sunlight sensor.

16. A method of controlling an imaging system, the method comprising:
detecting, by event detection circuitry, as an event, that a luminance change of a pixel that photoelectrically converts incident light exceeds a predetermined threshold;
capturing, by imaging circuitry, an image at a fixed frame rate;
controlling the event detection circuitry and the imaging circuitry, wherein the controlling performs control to acquire image information of a region including the event in response to the event detection circuitry detecting the event;
acquiring, by the event detection circuitry, the image;
detecting a state of a road surface based on the image acquired by the event detection circuitry;
dividing the image into regions; and
detecting the state of the road surface based on a state change amount per unit area obtained from the image obtained by the region division.

17. An object recognition system comprising the imaging system according to claim 1.

18. An object recognition system comprising the imaging system according to claim 6.

* * * * *